(12) United States Patent
Garrett et al.

(10) Patent No.: US 10,052,244 B2
(45) Date of Patent: Aug. 21, 2018

(54) VEHICLE MOUNTED EXTENDER APPARATUS

(71) Applicant: ACCESS-ABLE DESIGNS, INC., Vero Beach, FL (US)

(72) Inventors: Allen Garrett, Vero Beach, FL (US); Ricky Watkins, Vero Beach, FL (US); Joe Hardee, Vero Beach, FL (US); Josh Bittinger, Wirtz, VA (US)

( * ) Notice: Subject to any disclaimer, the term of this patent is extended or adjusted under 35 U.S.C. 154(b) by 54 days.

(21) Appl. No.: 15/395,391

(22) Filed: Dec. 30, 2016

(65) Prior Publication Data

US 2017/0190298 A1 Jul. 6, 2017

Related U.S. Application Data

(60) Provisional application No. 62/274,138, filed on Dec. 31, 2015.

(51) Int. Cl.
*A61G 3/00* (2006.01)
*A61G 3/08* (2006.01)
*A61G 3/02* (2006.01)
*B60R 9/06* (2006.01)
*A61G 5/10* (2006.01)

(52) U.S. Cl.
CPC ......... *A61G 3/0808* (2013.01); *A61G 3/0209* (2013.01); *A61G 5/104* (2013.01); *B60R 9/06* (2013.01)

(58) Field of Classification Search
CPC .... A61G 3/0808; A61G 3/0209; A61G 5/104; B60R 9/06

USPC ................ 224/281, 497, 502, 510
See application file for complete search history.

(56) References Cited

U.S. PATENT DOCUMENTS

| | | | | | |
|---|---|---|---|---|---|
| 4,573,854 | A | * | 3/1986 | McFarland | A61G 3/0209 224/553 |
| 4,685,860 | A | * | 8/1987 | McFarland | A61G 3/0209 212/280 |
| 4,786,072 | A | * | 11/1988 | Girvin | A61G 5/08 280/304.1 |
| 5,011,361 | A | * | 4/1991 | Peterson | A61G 3/0209 224/497 |
| 5,114,120 | A | * | 5/1992 | Bartelt | A61G 3/0209 224/509 |
| 5,308,214 | A | * | 5/1994 | Crain | A61G 3/0209 414/541 |
| 5,482,424 | A | * | 1/1996 | Jones | A61G 3/0209 224/510 |

(Continued)

*Primary Examiner* — Peter Helvey
(74) *Attorney, Agent, or Firm* — Stephen C. Thomas

(57) ABSTRACT

An apparatus for carrying a wheelchair, scooter or other object on the exterior of a vehicle. The apparatus may comprise a vertical slide and to horizontal slides. The horizontal slides may be pivotably attached such that the object to be carried may be extended, for example, from the rear of a vehicle along the rear side of the vehicle pivoting around to a side of the vehicle and extending along the side of the vehicle to a desired position. Thus, a wheelchair may be carried on the rear side of a vehicle and extended along the rear and side of the vehicle so that a user to directly access the wheelchair by opening a vehicle door and having the wheelchair within reach. After removing the wheelchair from the apparatus, the apparatus may retract into a non-extended position. The apparatus may attach to a vehicle using a trailer hitch receiver.

20 Claims, 16 Drawing Sheets

(56) References Cited

U.S. PATENT DOCUMENTS

| | | | | |
|---|---|---|---|---|
| 5,518,159 A * | 5/1996 | DeGuevara | B60R 9/06 | 224/282 |
| 5,664,717 A * | 9/1997 | Joder | B60R 9/06 | 224/502 |
| 5,746,563 A * | 5/1998 | Steckler | A61G 3/0209 | 414/462 |
| 5,827,036 A * | 10/1998 | Steffes | A61G 3/0209 | 414/462 |
| 5,884,826 A * | 3/1999 | Shaver | B60R 9/06 | 211/195 |
| 6,085,954 A * | 7/2000 | Bloemer | B60R 9/06 | 224/502 |
| 6,199,735 B1 * | 3/2001 | Cothern | B60R 9/06 | 224/509 |
| 6,830,423 B1 * | 12/2004 | Williams | B60P 1/5471 | 212/180 |
| 7,284,944 B1 * | 10/2007 | Schlangen | B60P 1/4421 | 414/541 |
| 7,402,019 B2 * | 7/2008 | Alexander | A61G 3/0209 | 414/462 |
| 8,132,997 B2 * | 3/2012 | Reuille | B60P 1/4421 | 224/537 |
| 8,186,930 B2 * | 5/2012 | Gaghis | A61G 3/0808 | 414/462 |
| 8,960,574 B2 * | 2/2015 | Hernandez | B60R 9/06 | 224/495 |
| 9,381,868 B2 * | 7/2016 | Anyan | B60R 9/06 | |
| 2002/0020728 A1 * | 2/2002 | Chimenti | B60R 9/06 | 224/509 |
| 2006/0045686 A1 * | 3/2006 | Alexander | A61G 3/0209 | 414/462 |
| 2006/0170180 A1 * | 8/2006 | Collins | B60R 3/02 | 280/166 |
| 2010/0040452 A1 * | 2/2010 | Egan | A61G 7/1001 | 414/812 |
| 2012/0292357 A1 * | 11/2012 | Tennyson | B60R 9/06 | 224/281 |

\* cited by examiner

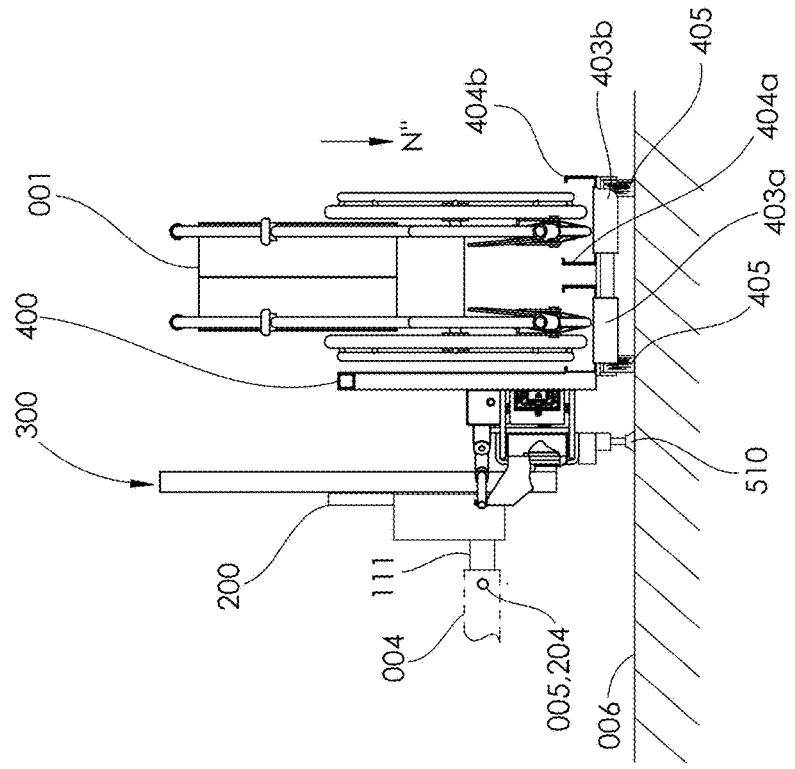
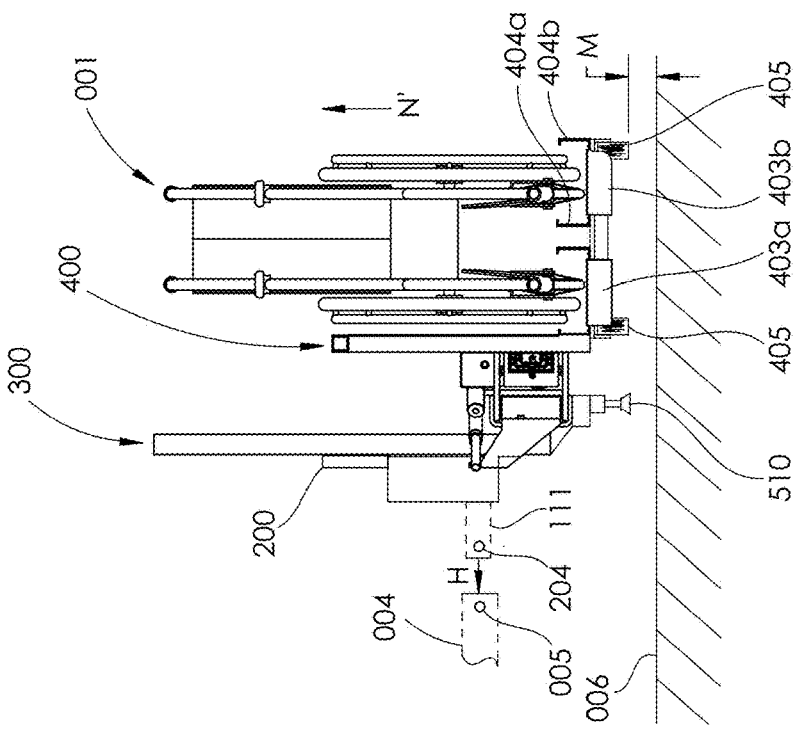

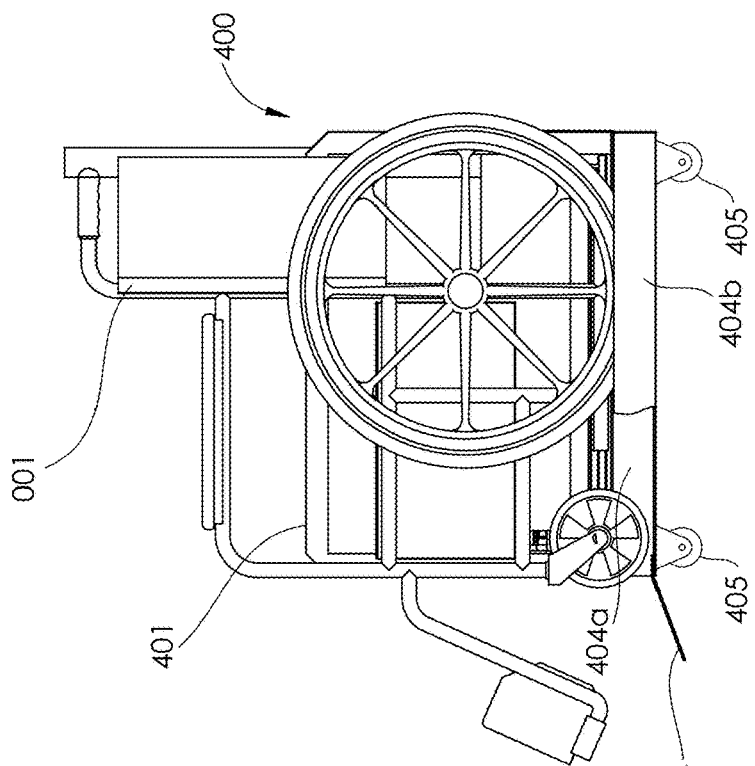
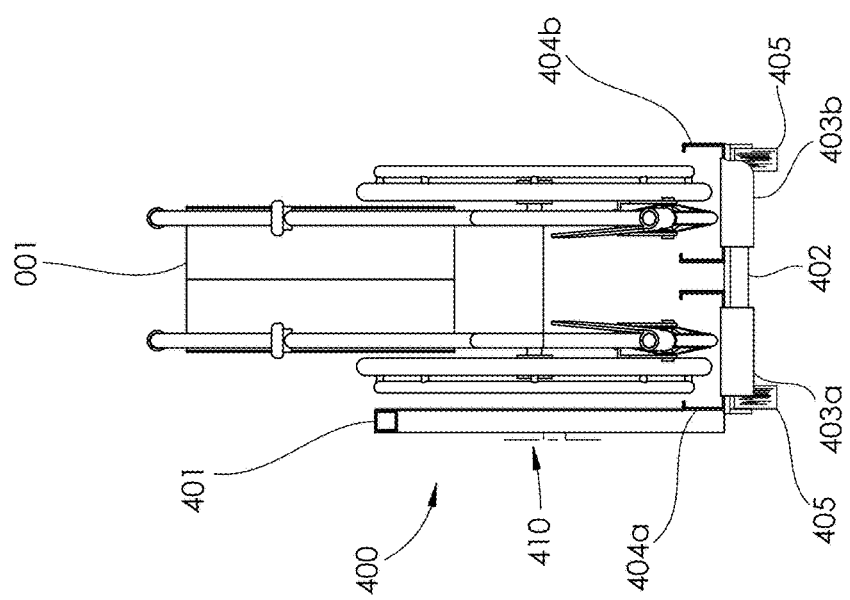
Fig. 6
Fig. 5

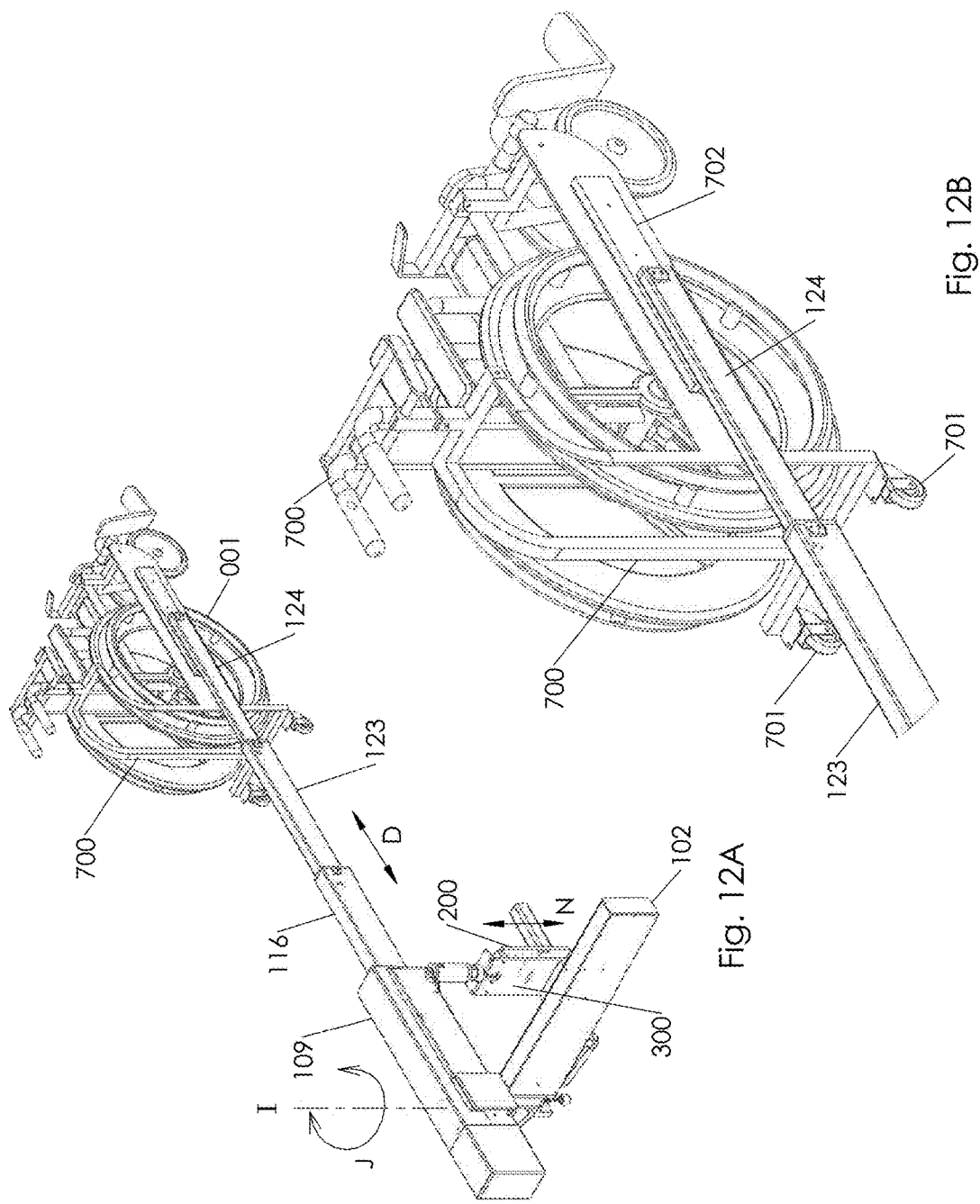

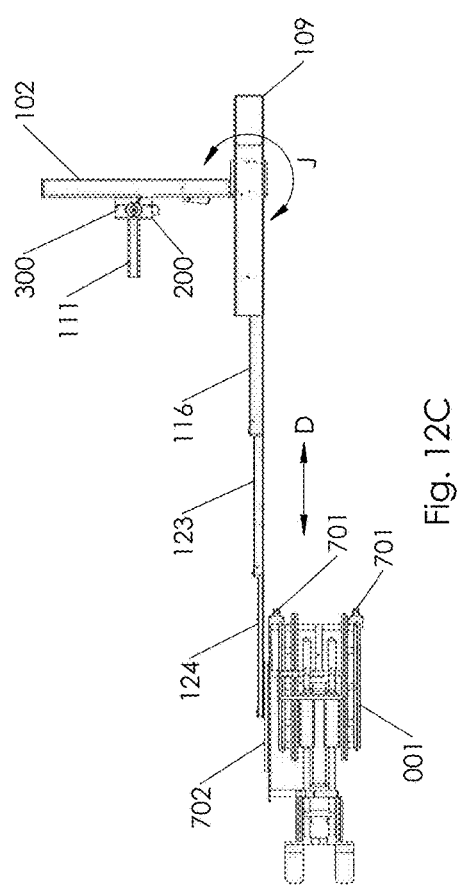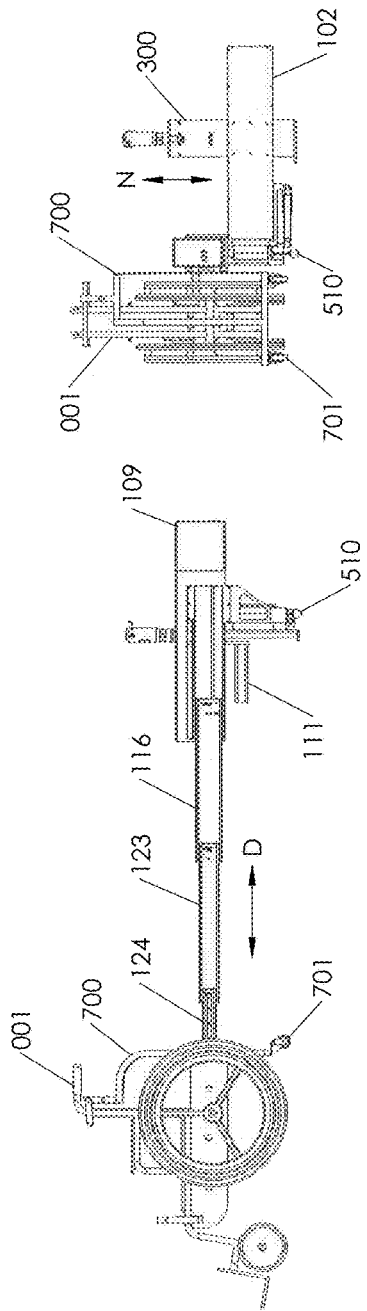

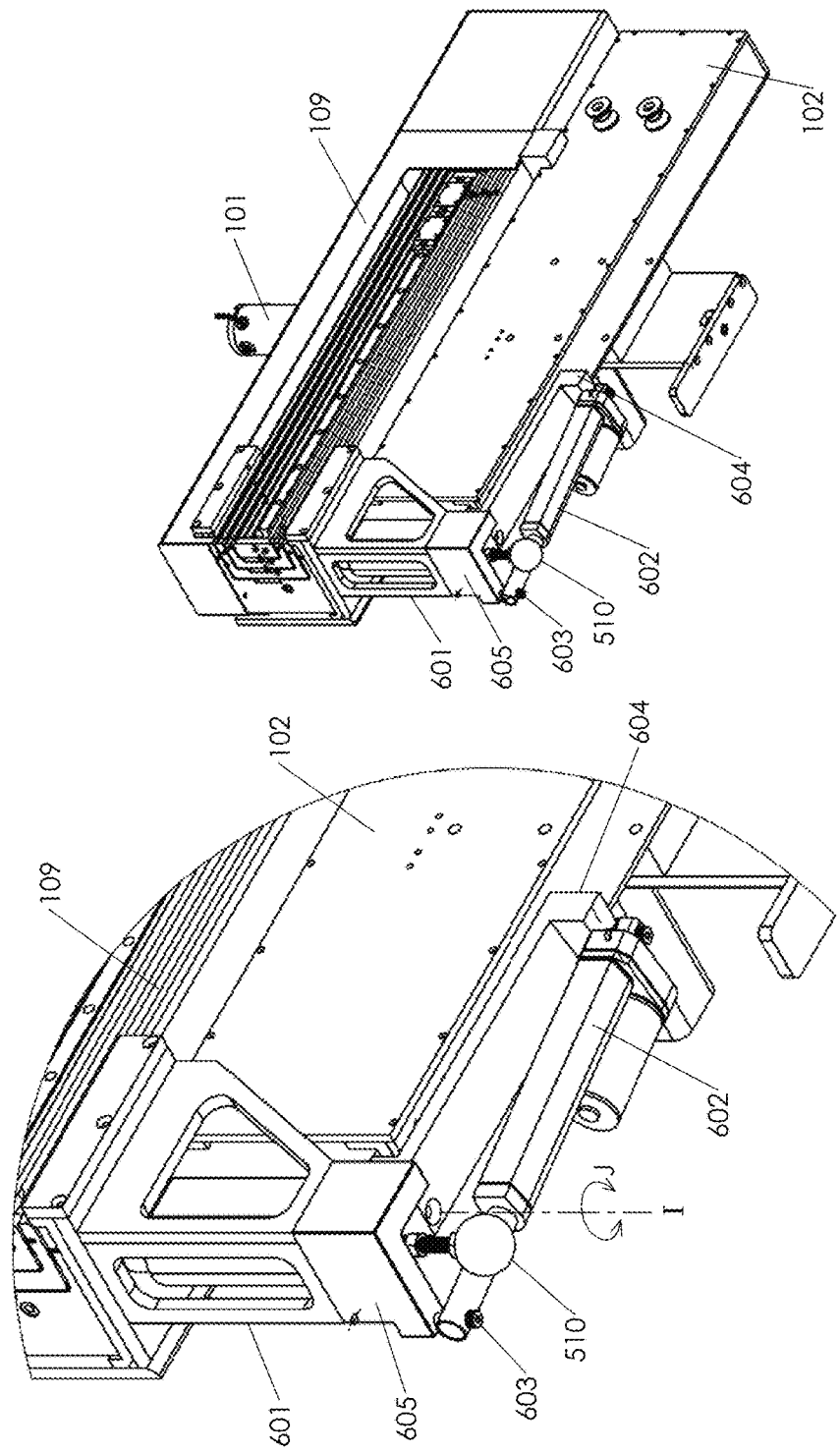

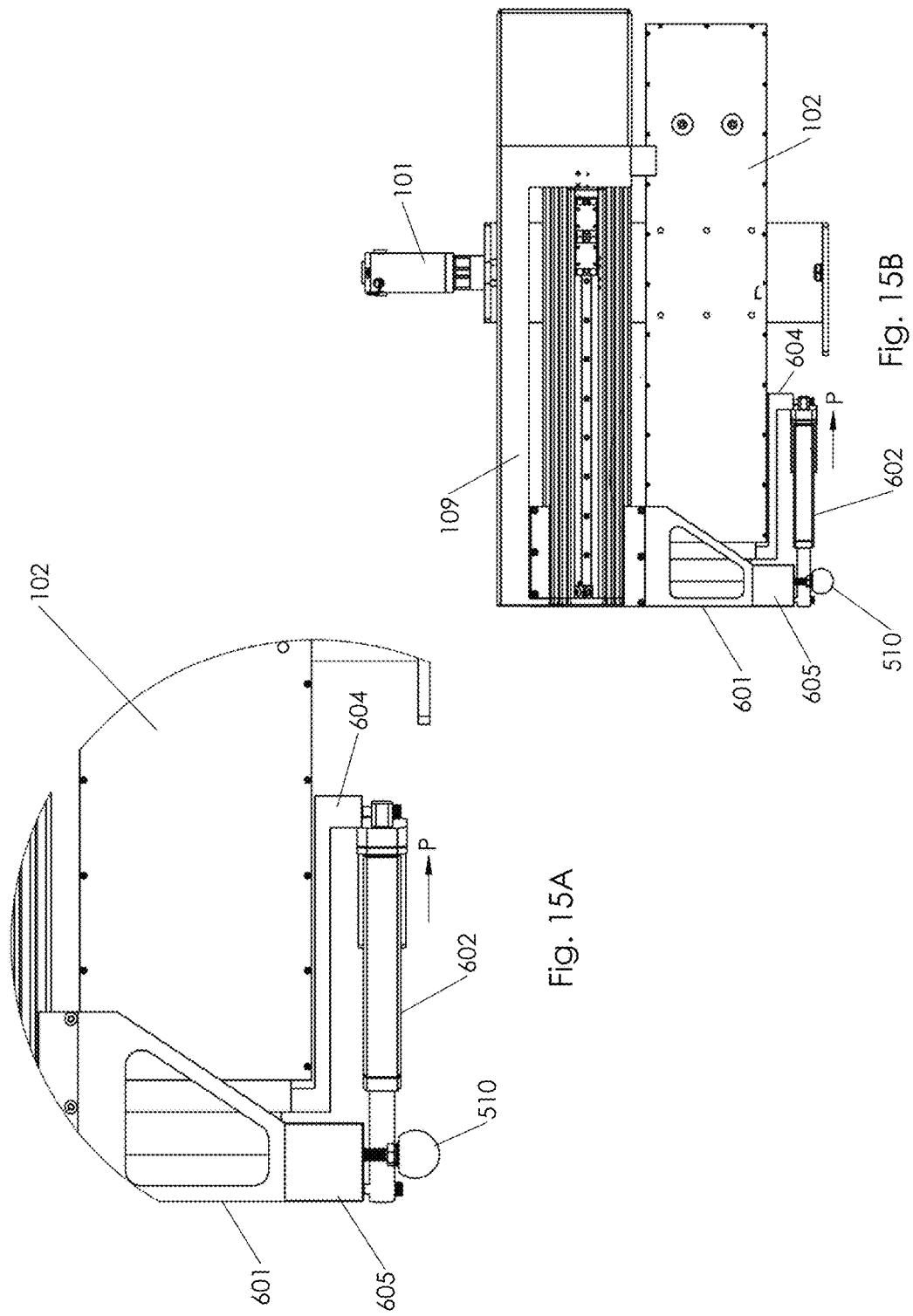

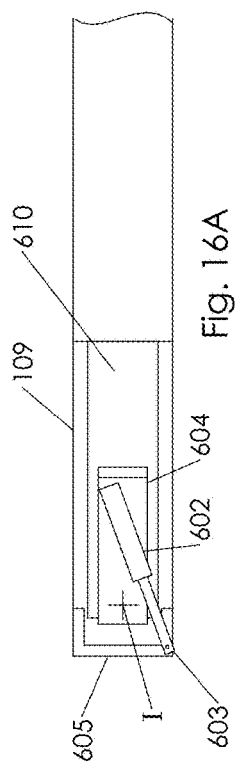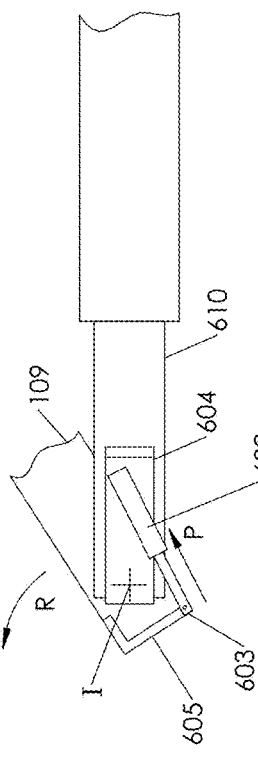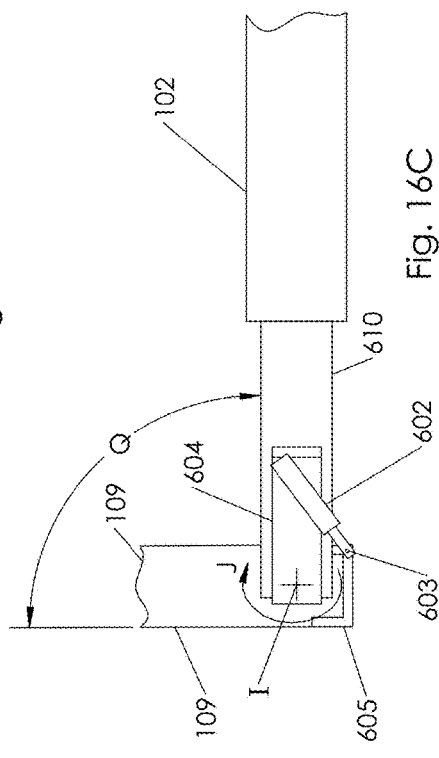

VEHICLE MOUNTED EXTENDER APPARATUS

CROSS REFERENCE TO RELATED APPLICATIONS AND INCORPORATION BY REFERENCE

This non-provisional application for patent filed under 35 U.S.C. 111(a) claims benefit of priority to provisional application for patent Ser. No. 62/274,138 filed in the United States Patent and Trademark Office on Dec. 31, 2015, titled VEHICLE MOUNTED EXTENDER APPARATUS, which is hereby incorporated by reference in its entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The field of the invention relates generally to devices for carrying wheelchairs, scooters, remotely piloted ground vehicles, and any other device or apparatus as may be desired to be carried on or by a vehicle such as an automobile or other vehicle. More specifically, the invention relates to devices and methods for carrying objects on a vehicle, and extending the object from a first side of the vehicle along the first side, pivoting at a corner of the vehicle and extending the object to be carried along a second side of the vehicle. Such devices and methods are useful, for example, when carrying a wheelchair or scooter on the rear side of a vehicle, and, when desired, extending the scooter or wheelchair along the rear of the vehicle, pivoting around a rear corner of the vehicle, and extending the scooter or wheelchair along a side of the vehicle to a passenger or driver door such that a user may exit a passenger or driver door and be in close proximity to, or to directly access, wheelchair or scooter. The examples provided herein are for exemplary purposes only and the scope of the invention is not to be construed as being limited to only the examples and embodiments described herein or depicted in the figures.

2. Background Art

Wheelchairs, scooters, and other objects are often carried on or in proximity to the rear side of a motor vehicle, such as an automobile or truck, when it is desired to transport such objects from one location to another. In many instances, such objects are either directly attached to a trailer hitch receiver or are carried in a frame that is directly attached to a trailer hitch receiver; or, in the alternative, may be attached a rear bumper of the vehicle. Typically, when a user arrives at a desired destination and desires to utilize the object that is being carried, they must exit the vehicle, ambulate along the side of the vehicle and around to the rear side of the vehicle from the passenger side or driver side door, and attend to releasing the object from the trailer hitch receiver or removing it from a frame that is directly attached to a trailer hitch receiver. This requires a user to be able to walk from the passenger or driver side door to the rear vehicle.

Not all users are able to ambulate easily from a passenger door or driver side door, along a side of the vehicle, to the rear of the vehicle so that they may access the object to be carried. These persons may experience difficulty caused by the physical condition of the user, such as a physical injury to an extremity or physical disability. This difficulty may also be caused by environmental factors such as extreme rain snow or sleet or other weather conditions that may cause slippery conditions underfoot. Furthermore, the surface upon which a user must ambulate in order to arrive at the rear of the vehicle make itself present a hazardous condition to the user. This could be the case, when a vehicle is partially parked over a deep puddle, slick surface, or other hazardous surface condition. In such situations it would be desirable that the object to be carried on one side of the vehicle be presented to a user on another side of the vehicle, such as a user exiting a passenger or driver side door, so that access to the object being carried, for instance a wheelchair or scooter, may be easily accessed without the need for the user to exit the vehicle and traverse the distance along the sides of the vehicle to reach the object.

What is needed in the art, therefore, is a method and device for extending an object to be carried, such as a wheelchair or scooter, from a first side of a vehicle to a second side of the vehicle so that it may easily be accessed by a user.

BRIEF SUMMARY OF THE INVENTION

The present invention comprises an apparatus and method that have one or more of the following features and/or steps, which alone or in any combination may comprise patentable subject matter.

The present invention overcomes the shortcomings of the prior art in that it provides a method and device for extending an object to be carried from a first side of a vehicle to a second side of the vehicle so that it may easily be accessed by a user. In a first embodiment, the object to be carried may be carried on a rear side of the vehicle where it may be extended along the rear side of the vehicle, pivoted around a rear corner of the vehicle and extended along a second side of the vehicle so as to present the object to be carried to a user, who may be a passenger exiting a driver-side or passenger side door. The vehicle may be an automobile, truck, or any other vehicle. The type of vehicle with which the invention is used is not intended to be construed as a limitation as to the scope of the invention.

In accordance with one embodiment of the invention, the invention comprises an apparatus comprising a vehicle mount, a vertical slide assembly, a first extendable horizontal slide assembly, a second extendable horizontal slide assembly, and a carrier assembly. The vertical slide assembly may be attached to the vehicle mount. The vehicle mount may be, but is not necessarily, square tubing that is adapted to be received by a trailer hitch receiver affixed to a vehicle in a removable attachment. The first extendable horizontal slide assembly may be attached to the vertical extendable slide assembly such that, by operating the vertical slide assembly, the first extendable horizontal slide assembly may be motivated in an upwards direction or downwards direction relative to the vehicle. The second extendable horizontal slide assembly may be pivotably attached to the first horizontal slide assembly such that the first extendable horizontal slide assembly may be extended along a first side of the vehicle from a closed position into an open, or extended, position, and where the second extendable horizontal slide assembly may be pivoted by means of a pivoting attachment between the first and second extendable horizontal slide assemblies, the pivoting taking place about an axis, the second extendable horizontal slide assembly then being extended from a closed position to an open position so as to extend along a second side of the vehicle. The carrier assembly or mobile device may be attached to a distal end of the second extendable horizontal slide assembly such that, when desired, it may be extended along the second side of the vehicle to a desired position.

As used herein, "object to be carried" may be any object. In a typical use of the invention, the object to be carried may be a wheelchair, scooter or other apparatus aid in personal mobility such as a powered scooter, or other like devices that aid a person in ambulation. However, any object may be carried by the invention. For example, the object to be carried may be a robotic device such as a remotely controlled or automatic robotic device used for investigating explosive devices such as may be used by law enforcement or military personnel; or, in another use, the object to be carried may be a remotely piloted robotic vehicle used for identifying dangerous chemical or biologic conditions or contaminants. Thus it can be seen that the object to be carried is not limited to wheelchairs or scooters. For purposes of description herein, it is understood that the term wheelchair is used as a convenience to mean any object to be carried.

Thus, in a typical use of an embodiment, an object to be carried such as a wheelchair or scooter may be carried by a vehicle when the scooter or wheelchair is disposed upon a surface of the carrier assembly, and when the first and second horizontal slide are in a closed, i.e. non-extended, position, placing the invention in a transport position. In such a condition, it would be typical that the vertical slide is disposed such that the carrier of the invention has been motivated upwardly into a transport position which results in the carrier assembly being elevated above the pavement of the support surface, which may be for instance a roadway or garage floor, at a safe distance so that the vehicle may traverse a roadway, parking garage surface or other support surface without risk that the carrier assembly will impact the support surface. The carrier assembly may comprise one or more casters, rollers, wheels or other rotating devices on its underneath surface such that it may be lowered onto a support surface upon which the vehicle is resting so that when the first and second slide assemblies are extended, the casters, rollers or wheels attached to the underneath surface of the carrier assembly bear the at least of a portion of the weight of the carrier assembly and any object disposed on the carrier assembly, while enabling a rolling engagement between the carrier assembly and the support surface such as a parking lot surface or other surface upon which the vehicle may be resting. In a typical use, the vehicle-mounted extender of the invention would be operated when the vehicle to which it is attached is in a non-moving state, however, this is not strictly necessary.

An exemplary method of the invention comprises the steps of providing an extendable vertical slide assembly, first extendable horizontal slide assembly, second extendable horizontal slide assembly, carrier assembly and vehicle mount as hereinbefore described; placing an object to be carried on a surface of the carrier assembly; causing the vertical slide assembly to be lowered such that wheels, casters, or other rolling devices disposed on underneath surface of the carrier assembly are in rolling contact with a support surface such that at least a portion of the weight of the object to be carried and the carrier assembly are borne by the wheels, casters or other rolling devices; causing the first horizontal slide assembly be extended along a first side of the vehicle to a corner of the vehicle; causing the second horizontal slide assembly to pivot relative to the first horizontal slide assembly such that the second horizontal slide assembly is oriented parallel to a second side of the vehicle; and extending the second horizontal slide assembly to a desired position. A further step of the method is removing the object to be carried from a carrier assembly. Further steps of the invention may include retracting the second horizontal slide assembly to a closed position, rotating the second horizontal slide assembly so that the first horizontal slide assembly may be retracted to a closed position, and raising the first horizontal slide, second horizontal slide and carrier assembly by motivating the vertical slide assembly in an upward direction. It is not necessary that the carrier comprise casters or other rolling means; rolling support may be provided by wheels of the object being carried, such as a wheelchair.

The present method and device of the invention overcome the shortcomings of the prior art by providing a method and device for extending an object to be carried from a first side of a vehicle to a second side of the vehicle so that it may easily be accessed by a user.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings:

In FIG. 2, the extension of the first extendable horizontal slide assembly is depicted, as is the extension of the second extendable horizontal slide assembly. The pivoting of the second extendable horizontal slide assembly on the first extendable horizontal slide assembly is also shown.

FIG. 3 depicts a side view of the extendable vertical slide assembly and vehicle mount of the first embodiment of the invention in which the vehicle mount is adapted to be received by a typical trailer hitch receiver that is attached to a vehicle. The invention is shown in a transport position. The movement of the extendable vertical slide assembly is depicted in this figure.

FIG. 4 depicts a side view of the extendable vertical slide assembly and vehicle mount of the first embodiment of the invention in which the vehicle mount is adapted to be received by a trailer hitch receiver that is attached to a vehicle. This figure further depicts the first extendable horizontal slide assembly and second extendable horizontal slide assembly, and the carrier assembly mounted to the second extendable horizontal slide assembly. In this figure the extendable vertical slide assembly has been extended such that the carrier is motivated in a downward direction into an operational position such that the one or more casters, wheels or rolling devices attached to an underneath surface of the carrier assembly are resting on a roadway, garage or other support surface which is the same support surface upon which the vehicle is resting such that the casters, wheels rolling devices bear at least a portion the weight of the object being carried by the carrier assembly.

FIG. 5 depicts a side view of a wheelchair mounted onto a cart of an embodiment of the invention FIG. 6 depicts a rear view of a wheelchair mounted onto a cart of an embodiment of the invention.

FIGS. 12A and 12B depict a perspective view of an alternate embodiment of the invention, showing the first and second extendable horizontal slide assemblies of the alternate embodiment each in an extended position and further showing a wheelchair mounted onto a wheelchair carrier of the invention.

FIG. 12C depicts a top view of an alternate embodiment of the invention, showing the first and second extendable horizontal slide assemblies of the alternate embodiment each in an extended position and further showing a wheelchair mounted onto a wheelchair carrier of the invention.

FIG. 12D depicts a side view of an alternate embodiment of the invention, showing the first and second extendable horizontal slide assemblies of the alternate embodiment each in an extended position and further showing a wheelchair mounted onto a wheelchair carrier of the invention.

FIG. 12E depicts a rearview of an alternate embodiment of the invention showing the first extendable horizontal slide assembly of the alternate embodiment in an extended position and further showing a wheelchair mounted onto a wheelchair carrier of the invention.

FIGS. 14A and 14B depict a perspective view of a view of an alternate embodiment of the invention, showing the pivot mechanism operable to pivot the second horizontal slide assembly relative to the first horizontal slide assembly using a linear actuator attached on one end to the first horizontal slide assembly and attached on its other end to the second horizontal slide assembly with a longitudinal axis of extension and retraction that is offset from the pivot axis.

FIGS. 15A and 15B depict a rear view of a view of an alternate embodiment of the invention, showing the pivot mechanism operable to pivot the second horizontal slide assembly relative to the first horizontal slide assembly using a linear actuator attached on one end to the first horizontal slide assembly and attached on its other end to the second horizontal slide assembly with a longitudinal axis of extension and retraction that is offset from the pivot axis.

FIGS. 16A, 16B and 16C depict a bottom view of a view of an alternate embodiment of the invention, showing the pivot mechanism operable to pivot the second horizontal slide assembly relative to the first horizontal slide assembly using a linear actuator attached on one end to the first horizontal slide assembly and attached on its other end to the second horizontal slide assembly with a longitudinal axis of extension and retraction that is offset from the pivot axis.

DETAILED DESCRIPTION OF THE INVENTION

Figure 1:
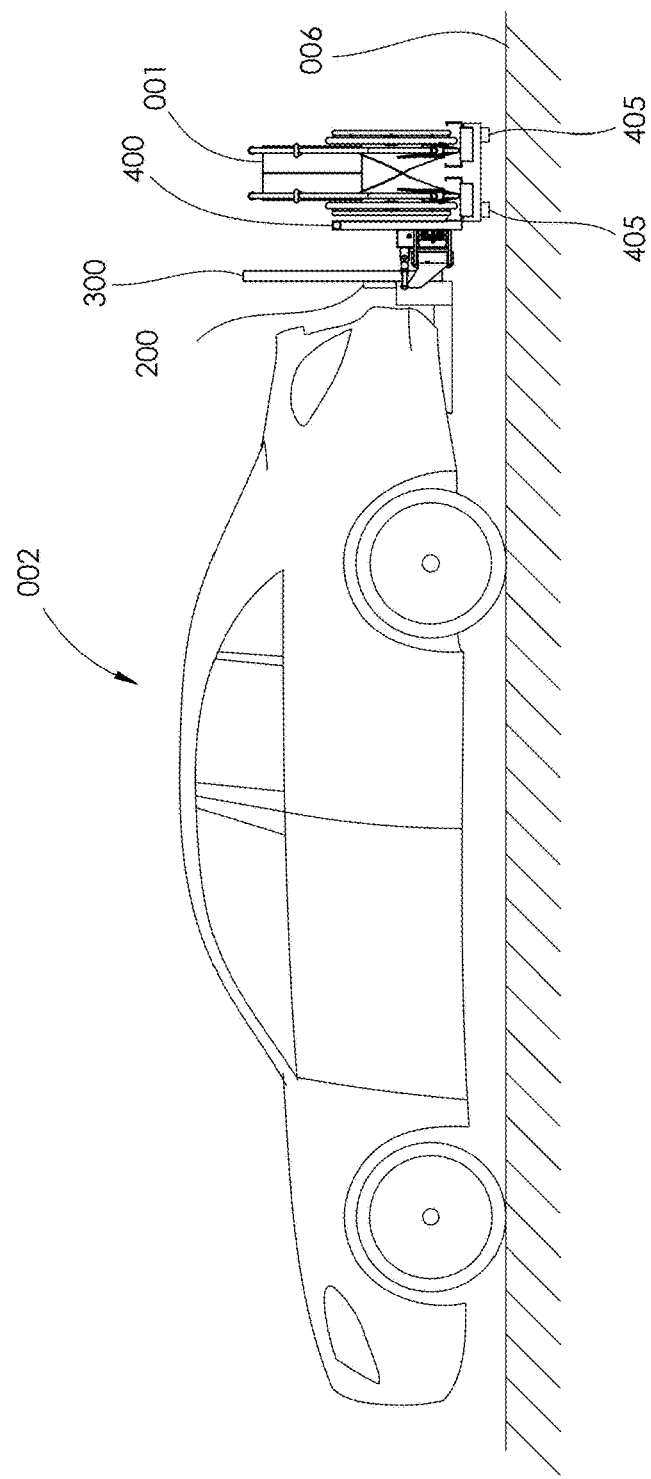
FIG. 1 depicts a side view of an exemplary embodiment of the invention in which an extendable vertical slide assembly is attached to a vehicle mount, the vehicle mount comprises a shank that is received in a removable attachment by a trailer hitch receiver which is attached to the vehicle; a first extendable horizontal slide assembly is attached to the vertical slide assembly so that it may be motivated in an up-and-down direction relative to the vehicle; a second extendable horizontal slide assembly is attached to the first extendable horizontal slide assembly; a carrier assembly is attached to the second extendable horizontal slide assembly; and an object to be carried, in this example a wheelchair, is disposed on a surface of the carrier assembly.

The following documentation provides a detailed description of the invention. Although a detailed description as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus the scope of the invention should be determined by the appended claims and their legal equivalents, and not merely by the preferred examples or embodiments given.

In the figures, like element callout numbers refer to like elements.

It is an object of the invention to be removably attached to a vehicle. This removable attachment may, for example, be achieved by a shank attached to the invention that is adapted to be received by a trailer hitch receiver of a vehicle. Thus, in one embodiment of the invention, the invention is carried by a vehicle adjacent to its rear surface by means of a removable attachment between the shank of the invention and the trailer hitch receiver mounted onto the vehicle. It is further an object of the invention that a wheelchair or other object to be carried is placed upon a carrier of the invention while the invention is removably attached to the vehicle. Thus, for example, if the vehicle is an automobile, a wheelchair may be carried upon the apparatus of the invention as the invention is removably attached to a surface of the vehicle.

When carrying an object on the invention a user may drive a vehicle to which the invention is removably attached to a desired destination. Once arriving at the destination, a user may desire to access the object to be carried, which may be a wheelchair. In many cases it is difficult for a user who may experience physical disabilities to open the vehicle door, ambulate to the rear of the vehicle, remove the wheelchair from a carrier, and unfold the wheelchair into an operational position. This difficulty may be exacerbated by certain environmental conditions such as slippery surfaces upon which the user may be required to walk, or severe weather such as rain or snow. Slippery surfaces either due to contaminants such as oil or due to environmentally caused slippery conditions such as rain or snow may present a significant threat of physical injury to a person who suffers from physical disabilities or to anyone in general. It is an object of the invention to motivate and to extend the object to be carried such as a wheelchair from the rear of the vehicle, along the rear surface of the vehicle, pivoting at a rear corner of the vehicle and extending along a side of the vehicle into a desired position in proximity to the user's door. The desired position in proximity to the user's door typically will allow the door to swing open without interference by the apparatus or the wheelchair disposed thereon. In this manner, a user of the invention may access the wheelchair without the need to traverse slippery surfaces and risk physical injury. Once the user has removed the wheelchair from the carrier of the invention, the invention may retract along the side of the vehicle, pivot, and further retract into its initial position. The user may then be free to utilize the wheelchair and ambulate as desired. Upon returning to the vehicle, the user may cause the apparatus of the invention to extend along the rear of the vehicle, pivot, and extend along the side of the vehicle into the desired position allowing the user to open the vehicle door, traverse the distance from the wheelchair into the vehicle seat, place the wheelchair on the carrier, and cause the apparatus of the invention to retract along the side of the vehicle, pivot at a rear corner of the vehicle, retract along the rear of the vehicle, and translate upwards into the transport position. The transport position may be a position defined as a position in which the extendable vertical has extended upwardly, lifting the carrier such that sufficient clearance is provided between the lowest surface of the carrier and the support surface upon which the vehicle is traveling so as to prevent damage to the invention.

The surface upon which the vehicle rests and travels is herein referred to as a support surface. The support surface may be a garage floor, the surface of the roadway, the surface of a parking garage or other parking surface, the ground or any other surface upon which a vehicle may rest or travel. This surface is referred to in the drawings as callout element 006.

Figure 2:
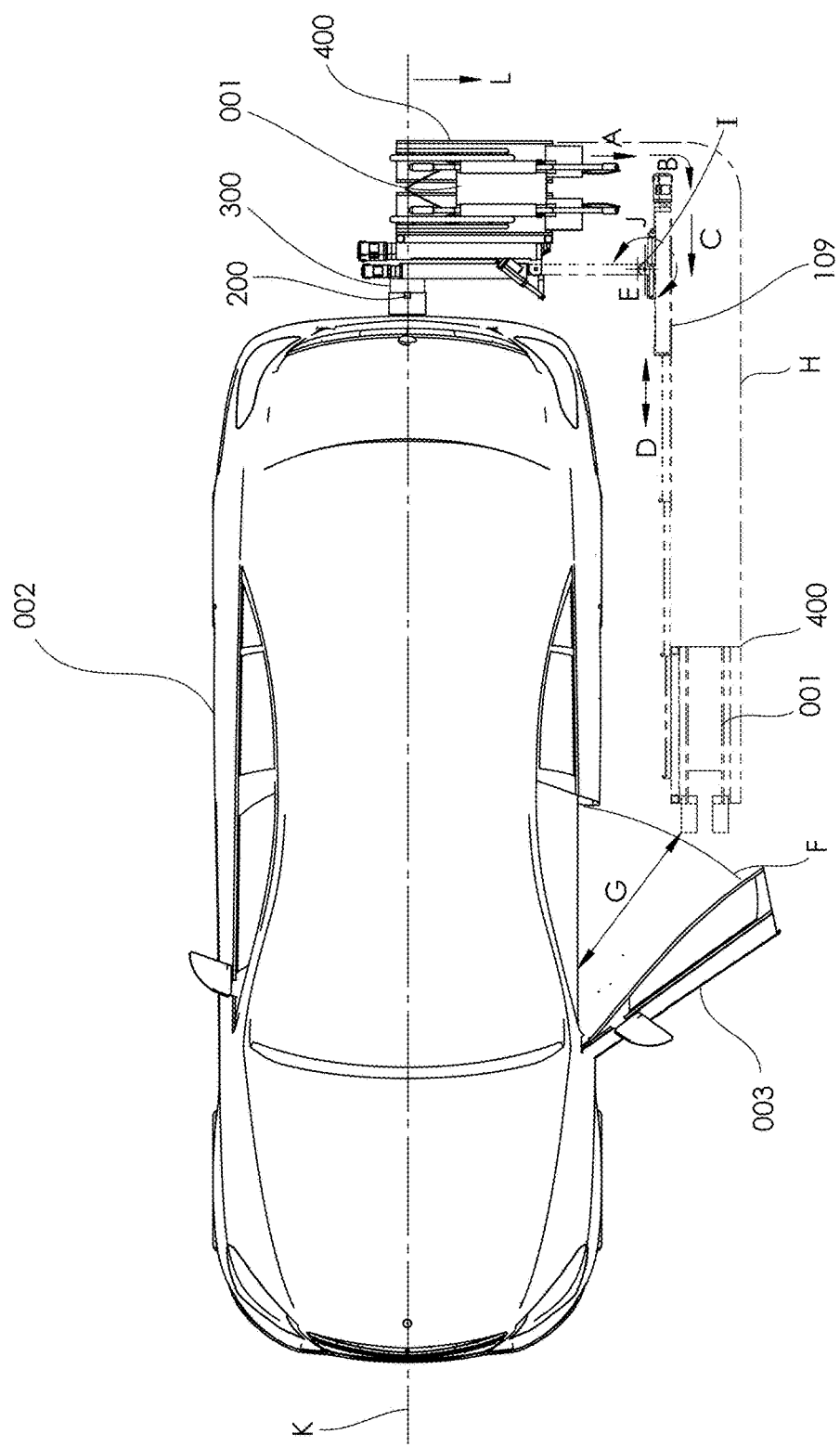
FIG. 2 depicts a top view of the first embodiment of the invention in which an extendable vertical slide assembly is attached to a vehicle mount, the vehicle mount comprises a shank that is received in a removable attachment by a trailer hitch receiver which is attached to the vehicle; a first extendable horizontal slide assembly is attached to the vertical slide assembly so that it may be motivated in an up-and-down direction relative to the vehicle; a second extendable horizontal slide assembly is attached to the first extendable horizontal slide assembly; the carrier assembly is attached to the second extendable horizontal slide assembly, and an object to be carried, in this case a wheelchair, is disposed on a surface of the carrier assembly.

The invention is generally described as comprising an extendable vertical slide assembly, which may comprise a first vertical slide member 200 and a second vertical slide member 300, which may be attached to a vehicle 002 preferably, but not necessarily, in a removable attachment; a first extendable horizontal slide assembly 102 attached to the vertical slide assembly; a second extendable horizontal slide assembly 109 pivotably or rotably attached to the second horizontal slide assembly 102; and a carrier which may take the form of several embodiments such as those embodiments depicted as 400 and 700 in the figures of the drawings upon which the object to be carried may be disposed, the carrier being attached to the second extendable horizontal slide assembly; wherein the first extendable horizontal slide assembly 102 comprises a distal end and a proximal end and wherein the proximal end of first extendable horizontal slide assembly 102 is attached to the vertical slide assembly; and wherein the second extendable horizontal slide assembly 109 comprises a distal end and a proximal end and wherein the proximal end of the second extendable horizontal slide assembly 109 is pivotably attached to the distal end of the first extendable horizontal slide assembly 102; and wherein the carrier is attached to the distal end of the second extendable horizontal slide assembly 109; and wherein the first extendable horizontal slide assembly 102 is extendable for a distance sufficient to allow the second extendable horizontal slide assembly 109 to extend along a side of a vehicle after pivoting on the pivotable attachment, clearing the side of the vehicle, and allowing the second extendable horizontal slide assembly 109 to extend for a distance sufficient to allow the carrier to be disposed in a desired position such as the position shown in FIG. 2. Thus, as can be seen, when the carrier is disposed in a desired position wheelchair 001 does not interfere with the opening of the vehicle door 003, allowing door 003 to swing an arc requiring clearance shown by arrow G in FIG. 2, and allowing a user sitting in the seat adjacent to door 003 to reach out to and manipulate wheelchair 001 so that they can enter the wheelchair.

It can thus be seen that the apparatus of the invention enables a user to access a wheelchair which has been carried upon a rear surface of the vehicle and which has been extended along the rear surface of the vehicle, pivoted on the pivoting attachment between the first extendable horizontal slide assembly and the second extendable horizontal slide assembly and then extended along the side of the vehicle position to the desired position shown in FIG. 2. Further, the removable attachment of the extendable vertical slide assembly to a vehicle may further may comprise a shank 111 for being received by a trailer hitch receiver. Still further the carrier further may comprise at least one caster having a rolling contact surface, such as the lower surface formed by a rolling element rotatably attached to the caster assembly which may be formed, for example, of a ball or wheel rotating on an axis, wherein the caster may be attached to an underneath surface of the carrier. Thus, the at least one caster allows the carrier to roll in a rolling engagement on supporting surface 006, making it easier for the carrier and the object to be extended into a desired position by the invention.

Still further, the vertical slide assembly may be further defined as having an upper position defined as being a transport position in which said at least one caster is not in contact with a support surface; and having an lowered, or operational, position defined as being a position in which the extendable vertical slide has been extended downward such that said rolling contact surface of said at least one caster is in contact with a support surface.

Further, each of the extendable vertical slide assembly, extendable first horizontal slide assembly 102 and second extendable horizontal slide assembly 109 may each independently be controllable to extend or retract as desired by a user, and may further comprise a controllable electric motor and mechanical means for extension in mechanical communication with said controllable electric motor. Mechanical means for extension of the slide assemblies of the invention may be any mechanical means known in the art for extension of slide assemblies such as, for example, ball screw assemblies, rack and gear assemblies, electromechanical actuators and the like. The motor(s) comprising the extendable vertical slide assembly, first extendable horizontal slide assembly 102 and second extendable horizontal slide assembly 109 may be in electrical or wireless communication with a controller and may therefore be controllable by the controller to extend or retract. The controller may comprise a microprocessor, firmware controller, or any other circuitry capable of executing computer readable instructions; a computer readable memory storing non-transitory computer executable instructions in communication with the controller; and drive circuitry in communication with the controller. The controller may further comprise a keypad and display, and may further comprise a speaker and microphone. A user may input commands into the controller by speaking or by entering commands on the keypad. The keypad may be a hardware keypad or software keypad. The user may thus instruct the controller to cause the apparatus of the invention to perform any or all of the operations described herein. The controller may further be in electrical communication with a wireless interface so that it may be in wireless communication with the motors of the extendable slide assemblies of the invention. Each of the motors of the extendable slide assemblies of the invention may further comprise wireless interfaces that are in wireless communication with the controller. The motors of the extendable slide assemblies of the invention may also be in wired electrical communication with the controller via a cable connected to the controller on one end, and connected to the motors of the invention on its other end.

Referring now to FIGS. 1, 2, 3 and 4, an embodiment of the invention is depicted assembled in a releasable attachment to a vehicle 002. While an automobile is depicted as vehicle 002, it is to be understood that vehicle 002 may be any vehicle, including vehicles adapted to operate on roadways, vehicles adapted to operate off roadways, and any other vehicles. The scope of the invention is not to be construed as being limited by the type of vehicle 002 which the invention may be releasably attached. An object to be carried such as a wheelchair 001 is carried upon a wheelchair support frame 400. Wheelchair support frame 400 may comprise casters having rolling elements 405. Rolling elements 405 may, when the invention is in a transport position as depicted in FIGS. 1 and 3, be separated from support surface 006 by a clearance distance M as depicted in FIG. 2. When the invention is disposed in the transport position clearance M allows the invention to be transported without the invention impacting support surface 006 or other reasonably expected surfaces such as curbs, dips, and other obstacles which may be reasonably anticipated as comprising a roadway or parking surface. The vertical slide assembly may be operated to motivate wheelchair carrier 400 in upwards or downwards in a vertical direction N' in FIG. 3, and N" in FIG. 4 so that wheelchair carrier 400 may be motivated into a transport position as shown in FIG. 3 or operational position as shown in FIG. 4. Thus, the vertical slide assembly may be operated to motivate wheelchair carrier 400 from a transport position to an operational position as desired by a user. In an operational position as depicted in FIG. 4, the lower surface of rolling elements 405 may be in contact with, and form a rolling engagement with, support surface 006 so that wheelchair carrier 400 may be motivated in a rolling engagement on support surface 006 along a rear side of the vehicle, pivoting at a rear corner of the vehicle, and continuing to be motivated along a side of the vehicle to a desired position such as proximal to a user's vehicle door 003 as depicted in FIG. 2.

Still referring to FIGS. 1, 2, 3 and 4, the invention may comprise shank 111 that is adapted to be received by trailer hitch receiver 004 which is attached to a side of the vehicle, preferably a rear side of the vehicle. Hitch receiver pinhole 005 and shank pinhole 204 may line up coaxially when shank 111 is inserted into and received by trailer hitch receiver 005. A locking pin may be inserted through hitch receiver pinhole 005 and shank pin hole 204 to secure shank 111 to trailer in receiver 004, thus securing the invention to the vehicle with a removable attachment. Further, a cotter pin or other securing element may be utilize to prevent the locking pin from spontaneously exiting hitch receiver pinhole 005 and shank pin hole 204 during use. The wheelchair carrier of the invention may further comprise channels 404a and 404b in order to guide the wheels of wheelchair 001 and keep them contained on the wheelchair carrier. Furthermore, ramps 403a and 403b may be fabricated from sheet metal, fiberglass, plastic or any other material, and may be utilized to aid wheelchair 001 in exiting the carrier when desired. Support 510 may be adjustable in a vertical direction and provide support in a vertical direction between the pivoting attachment of first extendable horizontal slide 102 and second extendable horizontal slide 109 and the support surface 006.

Still referring to FIGS. 1, 2, 3 and 4, during operation, the invention may be disposed in a transport position as depicted in FIG. 3 in which extendable vertical slide assembly, which comprises a first vertical slide member 200 and a second vertical slide member 300, which together form an extendable and retractable linear slide assembly in which first vertical slide member 200 and a second vertical slide member 300 may be extended or retracted linearly while still remaining attached to one another, have been utilized to raise the wheelchair carrier 400 in the direction of N' such that the wheelchair carrier is disposed a transport position. When vehicle 002 has arrived at a desired destination, a user may cause second vertical slide member 300 to be lowered, lowering the wheelchair carrier into an operational position as depicted in FIG. 4 in which the lower surfaces of the rolling elements of at least one caster 405 are in contact with support surface 006 in a rolling engagement. From this operational position, a user may operate the first extendable horizontal slide assembly in the direction of arrow A to motivate the wheelchair carrier along the rear side of the vehicle into pivot position E, pivoting about a rear corner of the vehicle on axis I in the direction of rotation J, changing direction of travel of wheelchair carrier 400 along the track shown by arrow B, and then extending the second horizontal slide assembly 109 in the direction of arrow D or C to motivate the wheelchair carrier into a desired position, which may be in proximity to the user's door as depicted in FIG. 2. In a desired position, the wheelchair carrier 400 and wheelchair 001 may be disposed in proximity to a user's door 003, but still allow door 003 to be opened swinging through arc F without interference from wheelchair carrier 400 and allowing wheelchair 001 to be located within a distance G from the user's door opening. Preferably, distance G is short enough to allow a user to grasp wheelchair 001 without requiring the user to exit the vehicle or to require weight bearing of the user's feet on support surface 006. When the wheelchair carrier 400 and wheelchair 001 are motivated by extending the first horizontal slide assembly 102 as described herein, they may follow the track of transverse extension A, which may be parallel with vehicle transverse direction L. When the wheelchair carrier 400 and wheelchair 001 are motivated by extending the second horizontal slide assembly as described herein, they may follow the track of longitudinal extension H, which may be parallel with vehicle longitudinal axis K. Vehicle transverse direction A may be at a right angle to vehicle longitudinal axis K.

It is understood that the invention may be attached to any side of a vehicle, front, rear or any side, and that the invention may be used to motivate a wheelchair carrier along such side to a pivot position such that the second horizontal slide assembly may be extended to motivate a wheelchair carrier along an adjacent side. Thus the invention may be used to carry and to motivate wheelchair carrier along any side of a vehicle and is not limited to the configuration shown in the figures in which the invention is attached to the rear of a vehicle and motivates a wheelchair carrier to a driver's side door on the left hand side of the vehicle as observed by the driver. The invention may also comprise a mirror image configuration in which the invention is attached to the rear of a vehicle and motivates a wheelchair carrier to a passenger's side door on the right hand side of the vehicle as observed by the driver, or, alternatively, the invention may be attached to the front of a vehicle and configured to motivate a wheelchair carrier along either side of the vehicle.

Referring now to FIGS. 5 and 6, one of several embodiments of the wheelchair carrier 400 is depicted. A wheelchair 001 may be disposed upon wheelchair carrier 400 as shown. In this exemplary embodiment, wheelchair carrier 400 is comprised of frame elements 401, 402, ramps 403a and 403b, channels 404a and 404b, and casters 405 as hereinbefore described. Wheelchair 001 may rest upon the carrier 400 with its wheels contained within channels formed by channels 404a and 404b. Carrier 400 may be attached to second vertical slide member 300 at point 410 by any means known in the mechanical arts such that it may be motivated upwardly or downwardly as desired by the user so that it may be disposed in a transport position or an operational position.

Figure 7:
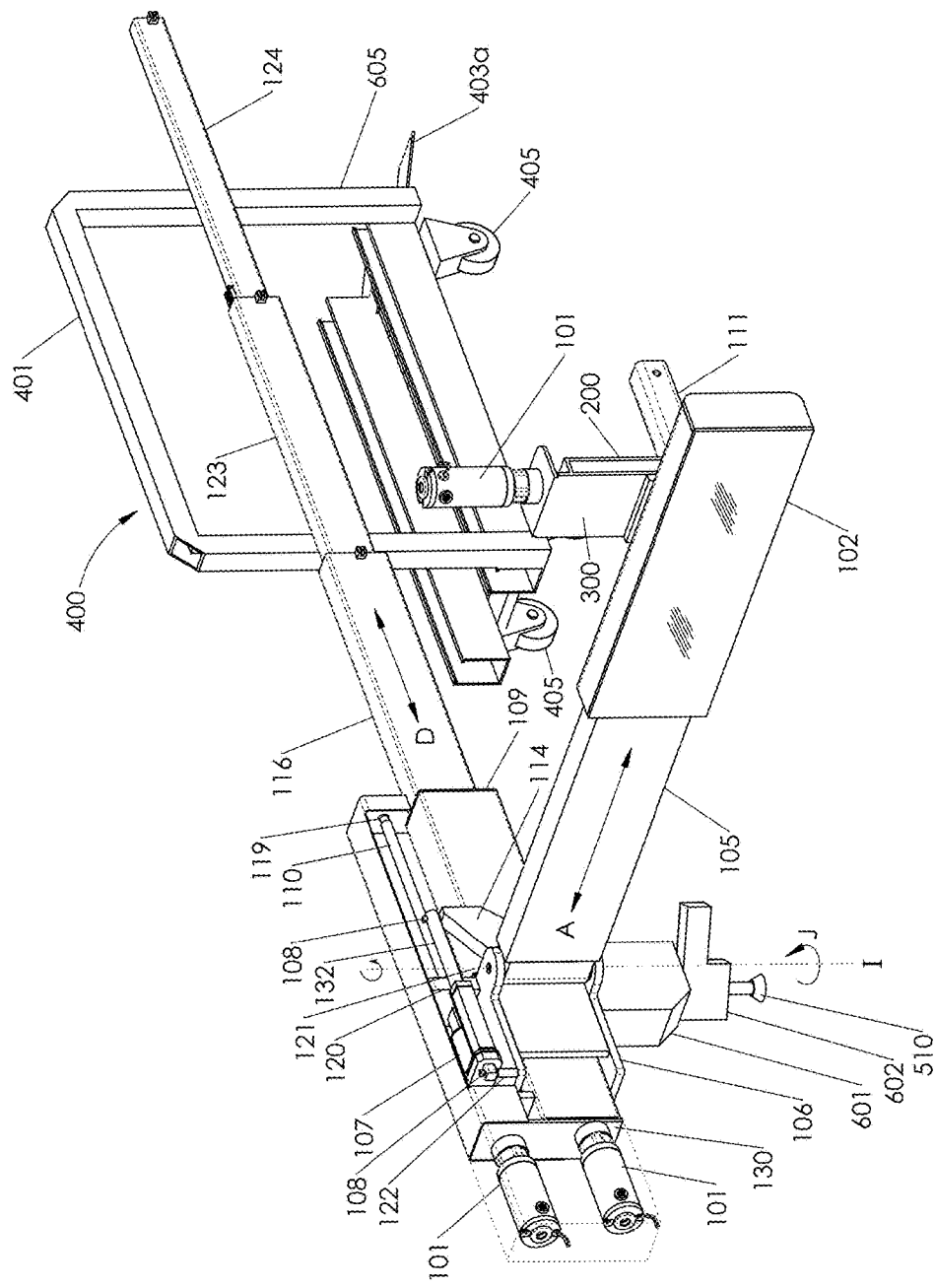
FIG. 7 depicts a perspective view of the first and second extendable horizontal slide assemblies of an embodiment of the invention in which both the first horizontal and second extendable horizontal slide assemblies are disposed in an extended position, and further depicting the axis of the pivotable attachment between the first extendable horizontal slide assembly and the second extendable horizontal slide assembly.
Figure 8:
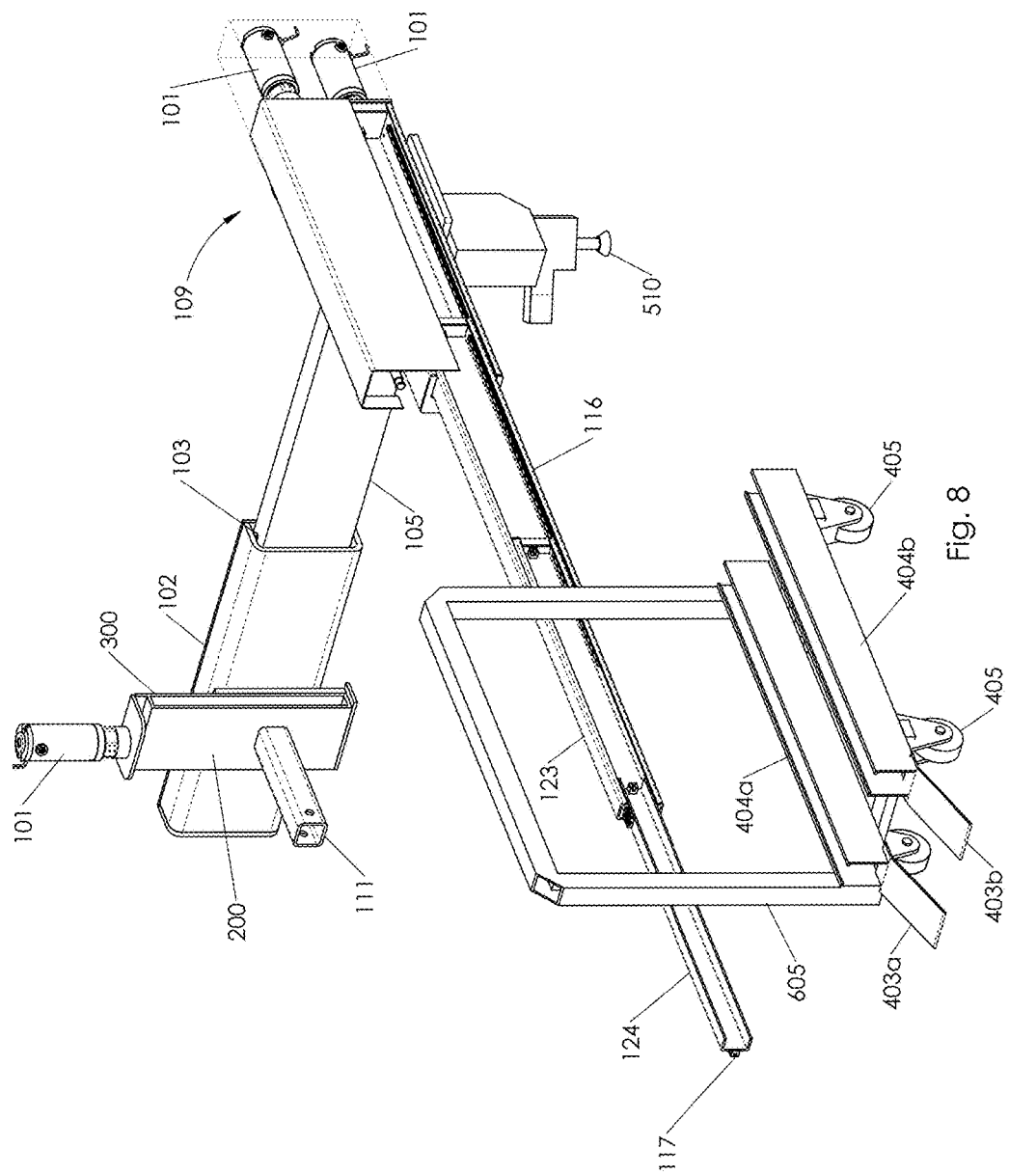
FIG. 8 depicts a perspective view of the first and second extendable horizontal slide assemblies of an embodiment of the invention, and further showing the attachment of a carrier of an embodiment of the invention attached to the second extendable horizontal slide assembly of the invention.
Figure 9:
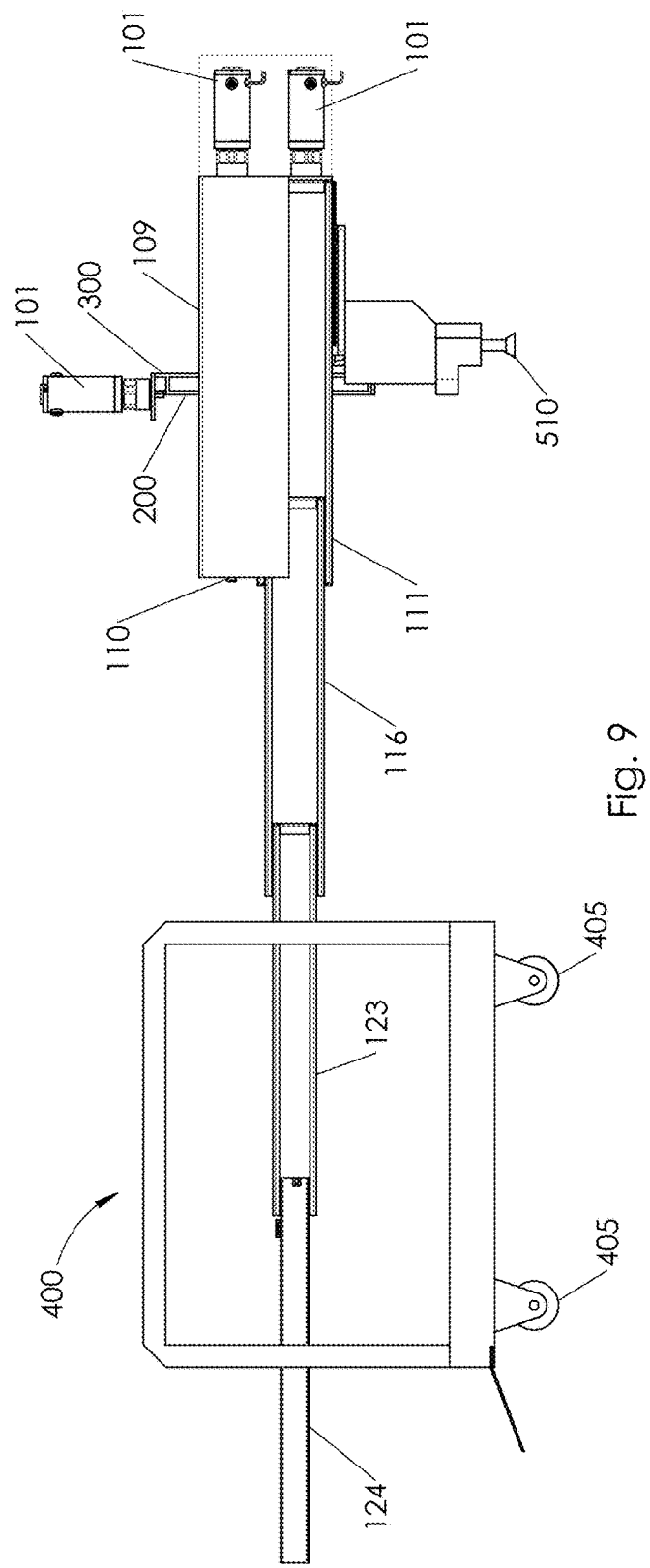
FIG. 9 depicts a side view of the second extendable horizontal slide assembly of the invention in an extended position, and further shows the attachment of a carrier of an embodiment of the invention attached to the second extendable horizontal slide assembly of the invention.
Figure 10:
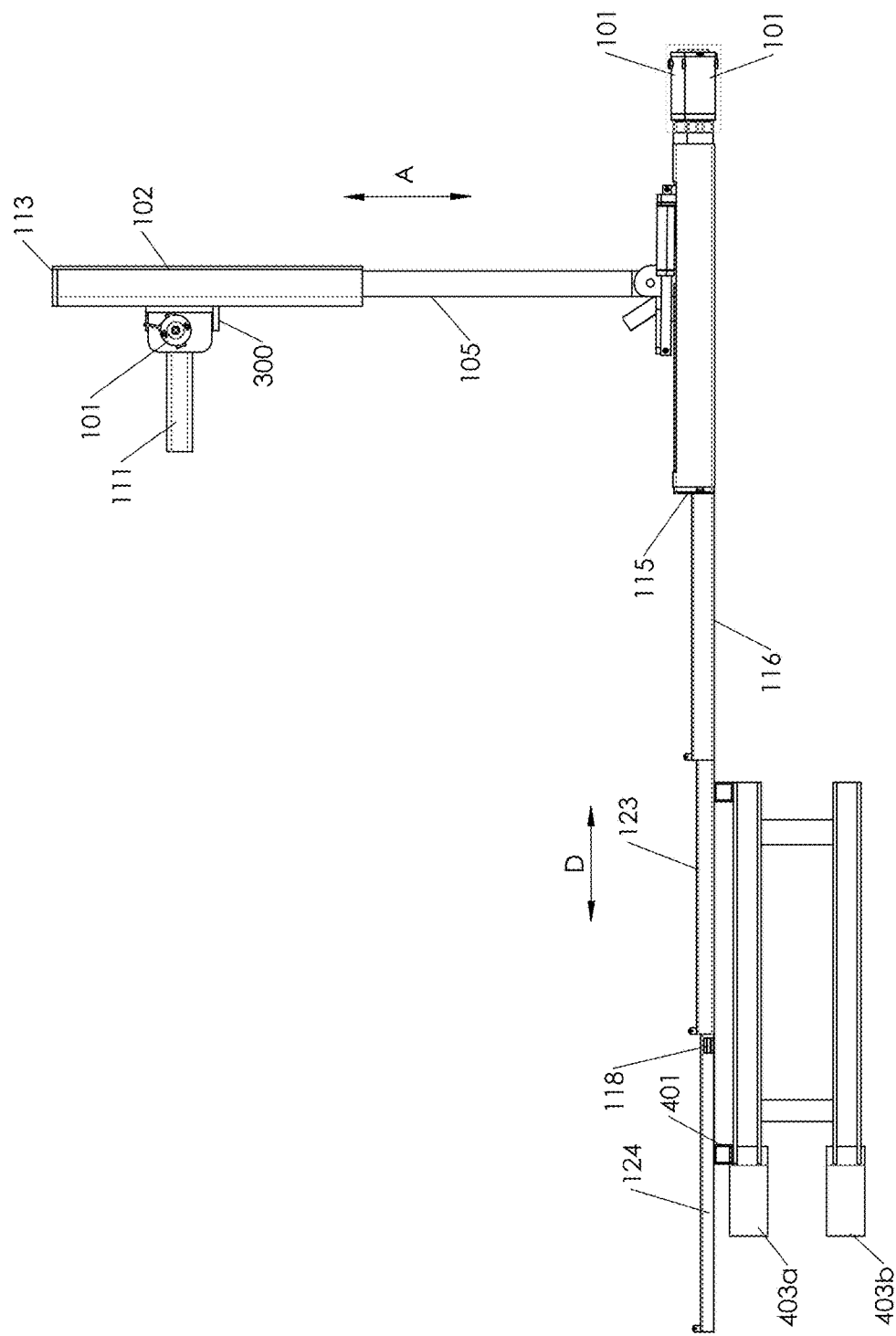
FIG. 10 depicts a top view of the first and second extendable horizontal slide assemblies of the invention, each in an extended position.

Referring now to FIGS. 7 and 8, perspective views of an exemplary embodiment of first extendable horizontal slide 102, second extendable horizontal slide 109, and the pivoting attachment between them are depicted. FIG. 9 depicts a side view of the same exemplary embodiment, and FIG. 10 depicts a top view of the same exemplary embodiment. It is to be understood that the details depicted in FIGS. 7, 8, 9 and 10 are exemplary. First extendable horizontal slide assembly 102 may comprise an extendable and retractable section 105. Second extendable horizontal slide assembly 109, may comprise extendable and retractable sections 116, 123, 124 which are also extendable and retractable as desired by the user. First extendable horizontal slide assembly 102 and second extendable horizontal slide assembly 109 may be pivotably attached at axis I such that first extendable horizontal slide assembly 102 may be extended into an extended position, whereupon second extendable horizontal slide assembly 109 may pivot on axis I in the direction shown as J, and whereupon second extendable horizontal slide assembly 109 may be extended into an desired position such that wheelchair carrier 400 is disposed in a desired position, which may be in proximity to a user's door such as the door of a vehicle. Motors 101, casters 405, shank 111, ramps 403a and 403b, channels 404a and 404b, first vertical slide member 200 and second vertical slide member 300 are shown for reference.

Figure 11:
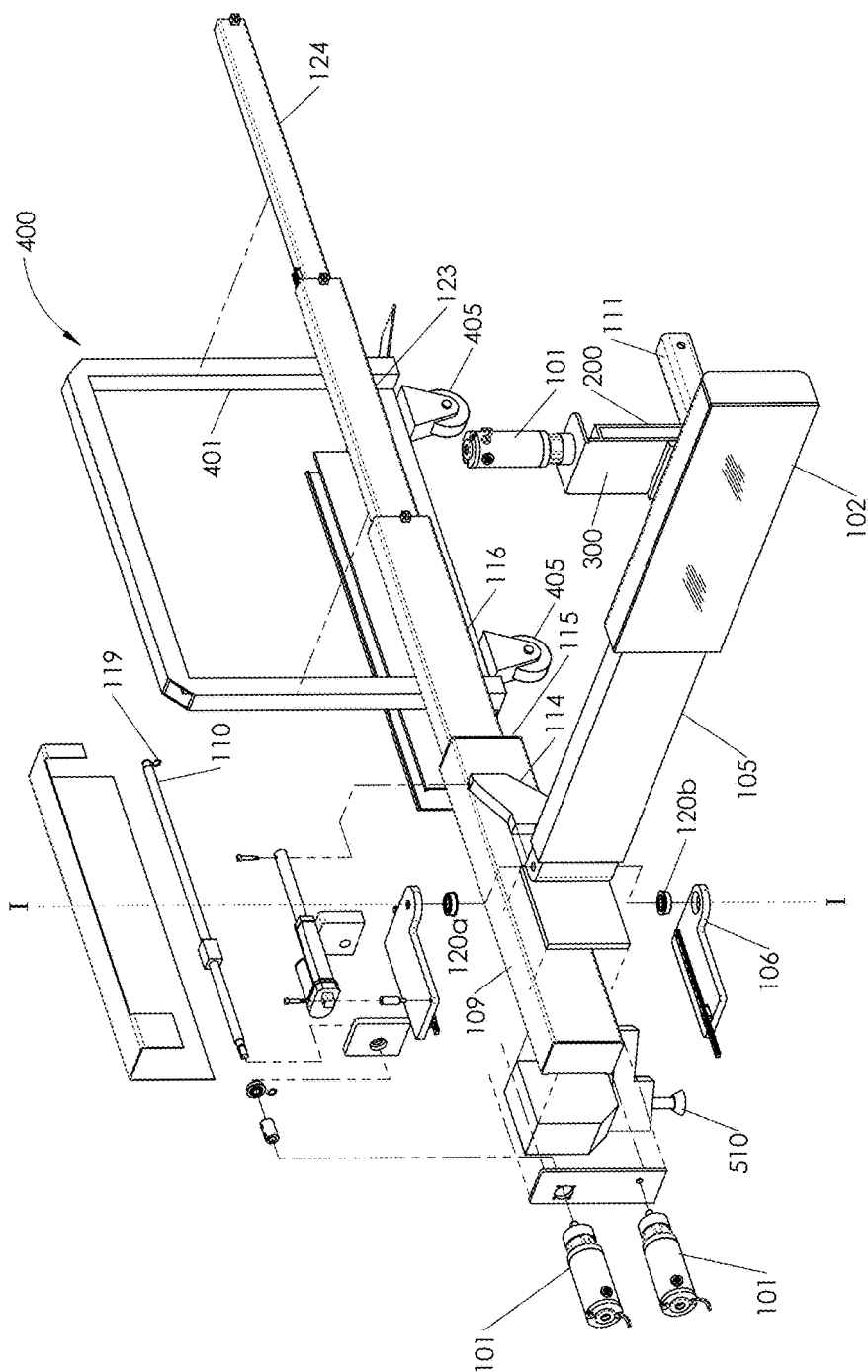
FIG. 11 depicts a perspective exploded view of the components of an embodiment of the first and second extendable horizontal slide assemblies of the invention, showing the first and second extendable horizontal slide assemblies each in an extended position for an embodiment of the invention. This exemplary view depicts one embodiment of the components comprising the pivotable attachment between the first extendable horizontal slide assembly and the second extendable horizontal slide assembly.

Referring now to FIG. 11, an exploded perspective view of an embodiment of the pivoting attachment between first horizontal slide assembly 102 and second extendable horizontal slide assembly 109 is depicted. The pivoting attachment pivots around axis I. Any pivoting or rotating attachment known in the mechanical arts may be utilized to form the pivoting attachment between first horizontal slide assembly 102 and second horizontal slide assembly 109. Bearings 120a and 120b may form bearing surfaces to aid in the rotation were pivoting between the first and second extendable horizontal slide assembly is about axis I. Motors 101 may each be individually controllable and in communication with a controller as described elsewhere herein for the purpose of controlling first extendable horizontal slide assembly 102 and second horizontal slice of the 109 individually into extended or retracted positions as may be desired by a user. Motors 101, casters 405, shank 111, first vertical slide member 200 and second vertical slide member 300 are shown for reference.

Referring now to FIGS. 12A, 12B, 12C, 12D and 12D, a further embodiment of the wheelchair carrier of the invention is depicted as item 700. The wheelchair carrier 700 of this embodiment may comprise a frame that is attached to an extendable member of second extendable horizontal slide assembly 109. Second extendable horizontal slide assembly 109 may comprise a plurality of extendable members 116, 123, and 124 each of which are extendable on command as hereinbefore described. Wheelchair carrier 700 may be attached to extendable member 124 by any means known in the art. Shank 111 may be adapted to be received by a trailer hitch receiver as hereinbefore described. First vertical slide member 200 may be attached to shank 111 and second vertical slide member 300 may be attached to first extendable horizontal slide assembly 102 so that first extendable horizontal slide assembly 102, second extendable horizontal slide assembly 109 and wheelchair carrier 700 may be motivated up or down as desired by a user such that wheelchair carrier 700 is disposed in a transport position, and operational position, or any position in between the two. Plate 702 may be attached to second extendable horizontal slide assembly element 124 and also attached to wheelchair carrier 700. It is understood that the means of attachment of wheelchair carrier 700 to second horizontal slide assembly 109 may be any means known in the mechanical arts and is not limited to the specific mechanical configuration depicted in the figures. First extendable horizontal slide assembly 102 and second extendable horizontal slide assembly 109 may be pivotably attached as hereinbefore described at axis I such that second extendable horizontal slide assembly 109 is able to rotate on axis I when first horizontal slide assembly 102 is extended such that to an extended position. After pivoting on axis I, second extendable horizontal slide assembly 109 may be extended as depicted by arrow D and also may be retracted as depicted by arrow D as desired by the user. Support 510 may operate to provide support second horizontal slide assembly 109 in proximity to and underneath pivot axis I. Support 510 may be disposed in a retracted position such that clearances provided between its lower surface and support surface 006 during transport. When the second vertical slide member 300 is motivated into an operational position by lowering it from its transport position in the direction of arrows N, support 510 may be lowered to come in contact with support surface 006. Casters 701, which may be any caster as described as caster 450, may be attached to an underneath surface of wheelchair carrier 700 and may provide a rolling engagement between wheelchair carrier 700 and support surface 006.

Figures 13A, 13B:
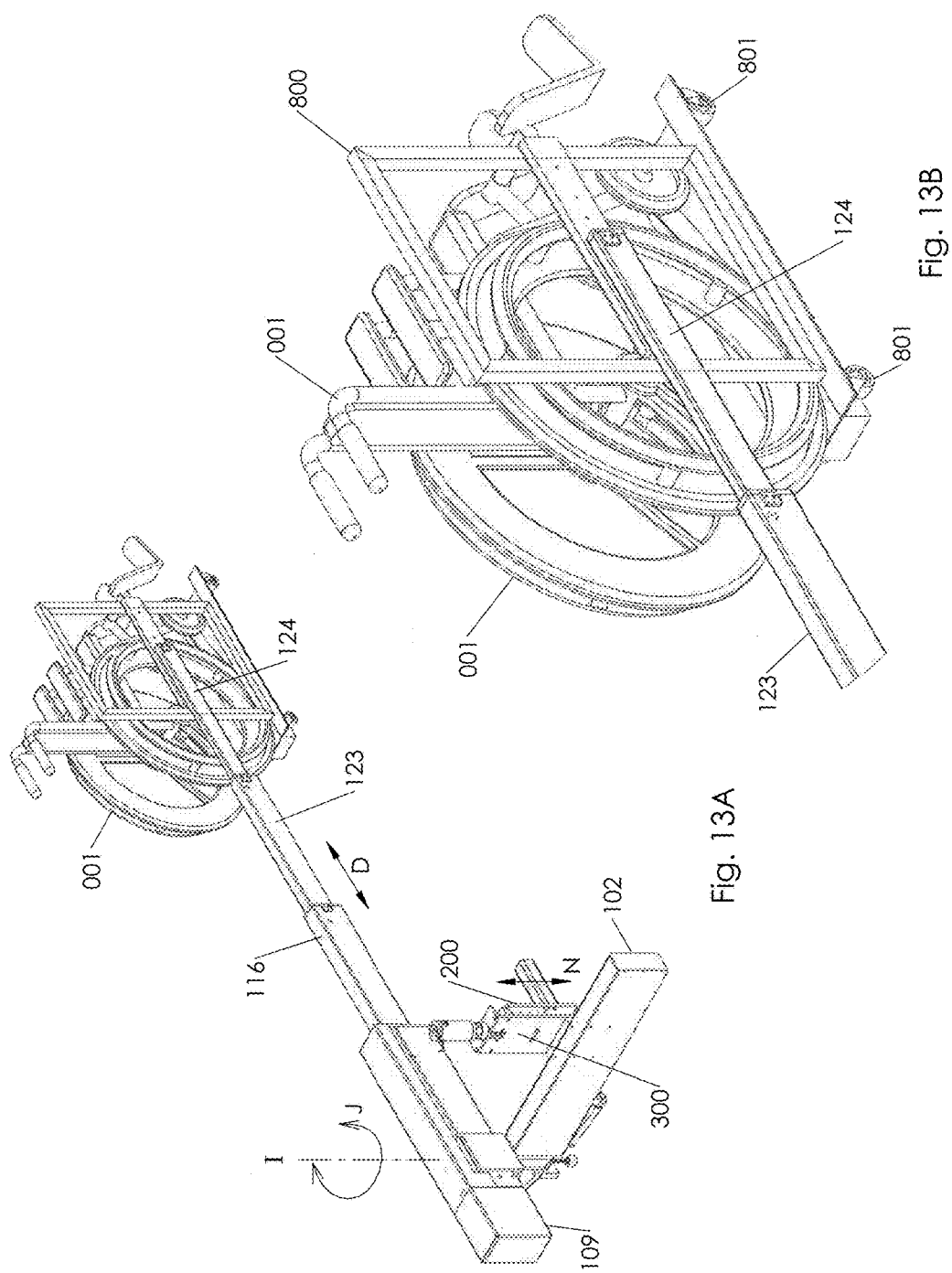
FIGS. 13A and 13B depict a perspective view of a further alternate embodiment of the invention, showing the first and second extendable horizontal slide assemblies of the alternate embodiment each in an extended position and further showing a wheelchair mounted on to an alternate embodiment of a wheelchair carrier of the invention.

Referring now to FIGS. 13A and 13B, a still further embodiment of the wheelchair carrier is depicted as element 800. Wheelchair carrier 800 may be attached to second extendable horizontal slide assembly element 124 by any means known in the mechanical arts. Shank 111 may be adapted to be received by a trailer hitch receiver as hereinbefore described. First vertical slide member 200 may be attached to shank 111 and second vertical slide member 300 may be attached to first extendable horizontal slide assembly 102 so that first extendable horizontal slide assembly 102, second extendable horizontal slide assembly 109 and wheelchair carrier 800 may be motivated up or down as desired by a user such that wheelchair carrier 700 is disposed in a transport position, and operational position, or any position in between the two. It is understood that the means of attachment of wheelchair carrier 800 to second horizontal slide assembly 109 may be any means known in the mechanical arts and is not limited to the specific mechanical configuration depicted in the figures. First extendable horizontal slide assembly 102 and second extendable horizontal slide assembly 109 may be pivotably attached as hereinbefore described at axis I such that second extendable horizontal slide assembly 109 is able to rotate on axis I when first horizontal slide assembly 102 is extended to an extended position. After pivoting on axis I, second extendable horizontal slide assembly 109 may be extended as depicted by arrow D and also may be retracted as depicted by arrow D as desired by the user. Support 510 may operate to provide support to second horizontal slide assembly 109 in proximity to and underneath pivot axis I. Support 510 may be disposed in a retracted position such that clearance is provided between its lower surface and support surface 006 during transport. When the second vertical slide member 300 is motivated into an operational position by lowering it from its transport position in the direction of arrows N, support 510 may be lowered to come in contact with support surface 006 as shown in FIG. 4.

Referring now to FIGS. 14A, 14B, 15A, 15B, 16A, 16B and 16C, various views of the pivot mechanism that is operable to cause second horizontal slide assembly 109 to pivot about axis I in relation to first horizontal slide assembly 102 are shown. It is to be understood that the embodiment depicted in these figures is exemplary and that the scope of the invention includes all equivalent structures and means for pivoting a structure relative to another structure. A pivot actuator 602, which may be a linear actuator, is attached on a first end to bracket 604 which is in turn attached to an underneath surface of an extensible member of first horizontal slide assembly 102. Pivot actuator 602 may be attached on its second end to bracket 605 which is attached to an underneath surface of second horizontal slide assembly 109 either directly or in conjunction with bracket 601. The axis of rotation I in the direction of rotation J is depicted in the figures for reference. Furthermore, extender ground support 510 is shown for reference. The wheelchair extender of the invention may be operated as follows. First, first horizontal slide assembly 102 may be extended such that its extensible member 610 is motivated into an extended position. Typically, the extended position of extensible member 610 is a position that allows the pivoting of second horizontal slide assembly 109 in relation to first horizontal slide assembly 102, allowing second horizontal slider simply 109 to be extended along a side of the vehicle in order to motivate a wheelchair placed in wheelchair carrier 400 or 700 into a desired position in proximity to a user's vehicle door. Once first horizontal slide assembly extensible member 610 has been motivated an extended position pivoting operation of second horizontal slide assembly 109 in relation to first horizontal slide assembly 102 may be initiated. To pivot second horizontal slide assembly 109 in relation to first horizontal slide assembly 102, pivot actuator 602 is retracted. Referring now to FIG. 16A, pivot actuator 602 is initially in an extended position. A first end of pivot actuator 602 is attached to bracket 604 which is attached to an underneath surface of extensible member 610. A second end of pivot actuator 602 is rotably attached by hardware 603 to bracket 605 which is attached to an underneath surface of second horizontal slide assembly 109 either directly or in combination with bracket 601. As pivot actuator 602 is retracted in the direction shown by arrow P in FIG. 16B, second horizontal slide assembly is caused to rotate in the direction depicted by arrow R about pivot axis I. The rotation of second horizontal slide assembly 109 in relation to first horizontal slide assembly 102 is aided by a rotable attachment between the two slide assemblies about axis I. This rotable attachment may be accomplished by the use of bearings, such as, for example, thrust bearings, whose outer races are attached to a surface of first horizontal slide assembly 102 and second horizontal slide assembly 109 positioning the bearings to allow rotation about an axis I, and further allowing rotation about an axle located on axis I that is adapted to accept inner races of the bearings. Equivalent structures allowing the pivoting of second horizontal slide assembly 109 in relation to the first horizontal slide assembly 102 are included within the scope of the invention. Referring now to FIG. 16C, pivot actuator 602 has continued to retract, rotating second horizontal slide assembly 109 in the direction R into a final position defined by angle Q which, may be, for example, 90°, but may be any angle is desired by the user. It is not necessary that angle Q be 90°. Once second horizontal slide assembly 109 has been thus rotated into a desired final position, horizontal slide assembly 109 may be extended to motivate a wheelchair placed on wheelchair carrier 400 or 700 into a desired position. Axis of rotation I and direction of rotation J are depicted in the figures for reference. Pivot actuator 602 has a longitudinal axis of extension and retraction that is offset from the pivot axis I, which causes second horizontal slide assembly 109 to pivot, or rotate, relative to first horizontal slide assembly 102 as described when pivot actuator 602 is commanded to extend or retract.

In any of the embodiments of the invention, the extendable vertical slide assembly, the first and second extendable horizontal slide assemblies, and the pivot actuator 602 in any combination or all of them, may be controllable for extension and retraction. In an embodiment, each of these slide assemblies may be controllable by means of an electric motor in communication with a controller. The communication between the electric motors and the controller may be wired and thus may be a conductive electrical interface, or maybe wireless, such as a wireless optical or radiofrequency communication link or any combination thereof. The controller may comprise a handheld or other unit that is capable of commanding any of the extendable slide assemblies of the invention to extend or to retract as desired by the user in order to motivate carrier 400 from a transport position into an operational position, to extend first extendable horizontal slide assembly to an extended position, to extend second horizontal slide assembly into an extended position such that the carrier is disposed in a desired position, and to cause all of the slide assemblies to retract such that they are all in a retracted position and the wheelchair carrier may then be motivated vertically by retracting second vertical slide member 300 in an upward direction such that the carrier is disposed in a transport position.

Figure 17:
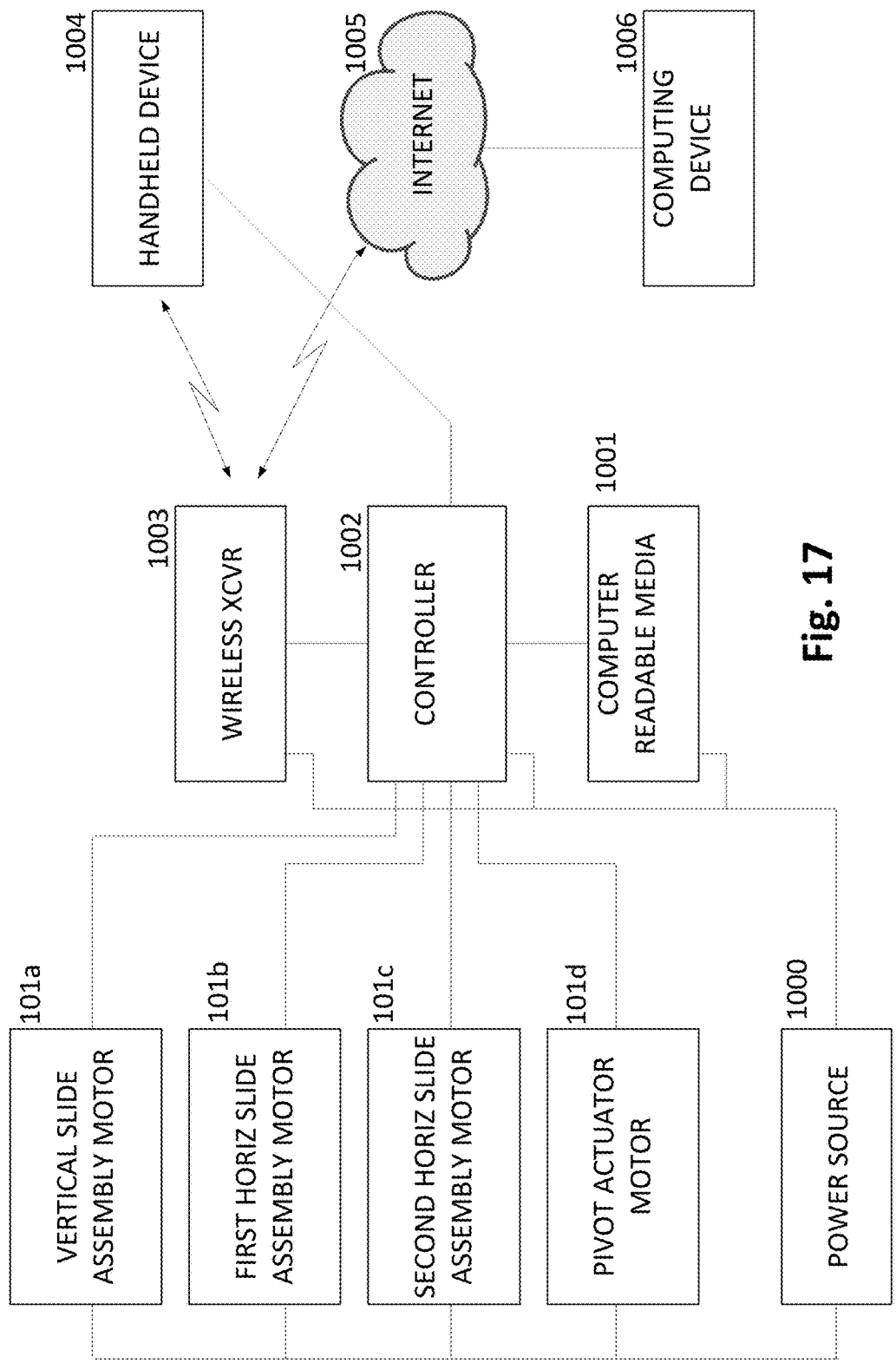
FIG. 17 depicts an exemplary electrical block diagram of the wheelchair extender.

Referring now to FIG. 17, an electrical block diagram of an embodiment of the invention is depicted. Motors 101*a*, 101*b*, 101*c* and 101*d* may be in electrical or wireless communication with controller 1002, and may also be in electrical communication with power source 1000 which may be, for example, a standalone battery or the battery of vehicle to which the wheelchair extender of the invention is attached. Controller 1002 may be in electrical communication with a computer readable media 1001, which may be an electronic memory capable of storing non-transitory computer readable and computer executable instructions. Controller 1002 may also be in electrical communication with at least one or a plurality of wireless transceivers 1003 which may be in wireless communication with a handheld device, such as a key fob or other electronic device, that comprise a user interface such as buttons, keyboard, touch screen or any other known user interface. Wireless transceivers 1003 may also be in wireless communication with the internet via cellular or other wireless communication means, and thereby be in data communication with a computing device 1006 which may be, for example, a tablet, cell phone or any computing device that is also in data communication with the internet. Controller 1002 may also be in electrical communication with handheld 1004 by conductive wiring such as, for example, a cable. A user may input commands to operate any of the features of the invention described herein into handheld device 1004 (which may be, for example, a key fob, cell phone, tablet, vehicle interface or any electronic device capable of communicating with controller 1002 and having an user interface); or, likewise, A user may input commands to operate any of the features of the invention described herein into computing device 1006. Controller 1002 receives such user commands and executes non-transitory computer readable and executable instructions stored in computer readable media 1001 to perform the operations of the invention by controlling the motors 101*a*, 101*b*, 101*c*, or 101*d* to operate the slides and actuators described herein.

In any of the embodiments of the invention the controller of the invention may comprise a microprocessor, controller, firmware controller, or any combination of hardware and software elements that are capable of executing non-transitory computer executable instructions. The non-transitory computer executable instructions may be contained in a computer readable media such as a memory, which may further be defined as a non-transitory computer readable memory. The controller may be in communication with each of the motors of the invention individually as hereinbefore described and may further comprise a keypad, microphone, wireless interface or other user input interface as is known in the electrical arts such that a user may input commands causing the controller to command the extendable slide assemblies of the invention to carry out the steps features of the invention described herein.

Although a detailed description as provided in the attachments contains many specifics for the purposes of illustration, anyone of ordinary skill in the art will appreciate that many variations and alterations to the details presented herein are within the scope of the invention.

What is claimed is:

1. An apparatus for carrying an object on a vehicle and extending the object to a desired position, comprising:

a vertical slide assembly attached to a vehicle;
a first extendable horizontal slide assembly attached to said vertical slide assembly;
a second extendable horizontal slide assembly pivotably attached to said second horizontal slide assembly; and
a carrier upon which the object to be carried may be disposed, said carrier being attached to said second horizontal slide assembly:
wherein said first extendable horizontal slide assembly comprises a distal end and a proximal end and wherein said proximal end is attached to said vertical slide assembly; and
wherein said second extendable horizontal slide assembly comprises a distal end and a proximal end and wherein said proximal end of said second extendable horizontal slide assembly is pivotably attached to said distal end of said first extendable horizontal slide assembly; and
wherein said carrier is attached to said distal end of said second extendable horizontal slide assembly; and
wherein said first extendable horizontal slide assembly is extendable for a distance sufficient to allow said second extendable horizontal slide assembly to extend along a side of a vehicle after pivoting on said pivotable attachment, allowing said second extendable horizontal slide assembly to extend for a distance sufficient to allow said carrier to be disposed in a desired position.

2. The apparatus of claim 1, wherein said removable attachment between said vertical slide assembly and a vehicle further comprises a shank for being received by a trailer hitch receiver.

3. The apparatus of claim 1, wherein said carrier further comprises at least one caster having a rolling contact surface and attached to and underneath surface of said carrier.

4. The apparatus of claim 2, wherein said carrier further comprises at least one caster having a rolling contact surface and attached to and underneath surface of said carrier.

5. The apparatus of claim 2, wherein said vertical slide is further defined as having an upper position defined as being a position in which said at least one caster is not in contact with a support surface; and wherein said upper position is further defined as being a position in which said rolling contact surface of said at least one caster is in contact with a support surface.

6. The apparatus of claim 1 in which each of said extendable vertical slide assembly, extendable first horizontal slide assembly and second extendable horizontal slide assembly each further comprise a controllable electric motor and mechanical means for extension in communication with said controllable electric motor.

7. The apparatus of claim 2 in which each of said extendable vertical slide assembly, extendable first horizontal slide assembly and second extendable horizontal slide assembly each further comprise a controllable electric motor and mechanical means for extension in communication with said controllable electric motor.

8. The apparatus of claim 3 in which each of said extendable vertical slide assembly, extendable first horizontal slide assembly and second extendable horizontal slide assembly each further comprise a controllable electric motor and mechanical means for extension in communication with said controllable electric motor.

9. The apparatus of claim 4 in which each of said extendable vertical slide assembly, extendable first horizontal slide assembly and second extendable horizontal slide assembly each further comprise a controllable electric motor and mechanical means for extension in communication with said controllable electric motor.

10. The apparatus of claim 5 in which each of said extendable vertical slide assembly, extendable first horizontal slide assembly and second extendable horizontal slide assembly each further comprise a controllable electric motor and mechanical means for extension in communication with said controllable electric motor.

11. The apparatus of claim 6 wherein one or more of said extendable vertical slide assembly, first extendable horizontal slide assembly and second extendable horizontal slide assembly is in electrical communication with a controller and is controllable to extend or retract by said controller.

12. The apparatus of claim 7 wherein one or more of said extendable vertical slide assembly, first extendable horizontal slide assembly and second extendable horizontal slide assembly is in electrical communication with a controller and is controllable to extend or retract by said controller.

13. The apparatus of claim 8 wherein one or more of said extendable vertical slide assembly, first extendable horizontal slide assembly and second extendable horizontal slide assembly is in electrical communication with a controller and is controllable to extend or retract by said controller.

14. The apparatus of claim 9 wherein one or more of said extendable vertical slide assembly, first extendable horizontal slide assembly and second extendable horizontal slide assembly is in electrical communication with a controller and is controllable to extend or retract by said controller.

15. The apparatus of claim 10 wherein one or more of said extendable vertical slide assembly, first extendable horizontal slide assembly and second extendable horizontal slide assembly is in electrical communication with a controller and is controllable to extend or retract by said controller.

16. The apparatus of claim 11 wherein one or more of said extendable vertical slide assembly, first extendable horizontal slide assembly and second extendable horizontal slide assembly is in wireless communication with a controller and is controllable to extend or retract by said controller.

17. The apparatus of claim 12 wherein one or more of said extendable vertical slide assembly, first extendable horizontal slide assembly and second extendable horizontal slide assembly is in wireless communication with a controller and is controllable to extend or retract by said controller.

18. The apparatus of claim 13 wherein one or more of said extendable vertical slide assembly, first extendable horizontal slide assembly and second extendable horizontal slide assembly is in wireless communication with a controller and is controllable to extend or retract by said controller.

19. The apparatus of claim 14 wherein one or more of said extendable vertical slide assembly, first extendable horizontal slide assembly and second extendable horizontal slide assembly is in wireless communication with a controller and is controllable to extend or retract by said controller.

20. The apparatus of claim 15 wherein one or more of said extendable vertical slide assembly, first extendable horizontal slide assembly and second extendable horizontal slide assembly is in wireless communication with a controller and is controllable to extend or retract by said controller.

* * * * *